(12) United States Patent
Hirabayashi

(10) Patent No.: US 11,469,421 B2
(45) Date of Patent: Oct. 11, 2022

(54) CONDUCTIVE MATERIAL DISPERSION, BINDER RESIN-CONTAINING CONDUCTIVE MATERIAL DISPERSION, SLURRY FOR ELECTRODE FILM, ELECTRODE FILM, AND NON-AQUEOUS ELECTROLYTE SECONDARY BATTERY

(71) Applicants: TOYO INK SC HOLDINGS CO., LTD., Tokyo (JP); TOYOCOLOR CO., LTD., Tokyo (JP)

(72) Inventor: Honami Hirabayashi, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 17/676,787

(22) Filed: Feb. 21, 2022

(65) Prior Publication Data

US 2022/0173401 A1    Jun. 2, 2022

Related U.S. Application Data

(63) Continuation of application No. PCT/JP2021/032214, filed on Sep. 2, 2021.

(30) Foreign Application Priority Data

Sep. 3, 2020 (JP) ............... JP2020-148210

(51) Int. Cl.
*H01M 4/04* (2006.01)
*H01M 4/62* (2006.01)
*C08L 101/12* (2006.01)

(52) U.S. Cl.
CPC ......... *H01M 4/622* (2013.01); *H01M 4/0416* (2013.01); *H01M 4/625* (2013.01)

(58) Field of Classification Search
None
See application file for complete search history.

(56) References Cited

U.S. PATENT DOCUMENTS

| 2007/0224106 A1 | 9/2007 | Sakakibara et al. |
| 2018/0090764 A1 | 3/2018 | Fukumine et al. |

(Continued)

FOREIGN PATENT DOCUMENTS

| CN | 107851800 | 3/2018 |
| CN | 108028358 | 5/2018 |

(Continued)

OTHER PUBLICATIONS

"Office Action of Korea Counterpart Application", dated Apr. 14, 2022, with English translation thereof, p. 1-p. 11.

(Continued)

*Primary Examiner* — Tracy M Dove
(74) *Attorney, Agent, or Firm* — JCIPRNET

(57) ABSTRACT

A conductive material dispersion containing a conductive material containing carbon fibers, a dispersant, and an amide-based organic solvent, in which the dispersant contains a copolymer A containing a nitrile group-containing structural unit and satisfies following conditions.
(I) A pH of the conductive material dispersion is 9.0 or greater.
(II) A phase angle of the conductive material dispersion at a frequency of 1 Hz obtained by dynamic viscoelasticity measurement is 19° or greater, and a complex elastic modulus of the conductive material dispersion obtained by dynamic viscoelasticity measurement is less than 20 Pa.

14 Claims, 1 Drawing Sheet

(56) References Cited

U.S. PATENT DOCUMENTS

| | | |
|---|---|---|
| 2018/0175370 A1 | 6/2018 | Kim et al. |
| 2018/0198126 A1 | 7/2018 | Fukumine et al. |
| 2018/0226650 A1 | 8/2018 | Yoo et al. |
| 2018/0277848 A1 | 9/2018 | Matsumura et al. |
| 2019/0044150 A1 | 2/2019 | Kim et al. |
| 2019/0348681 A1 | 11/2019 | Annaka et al. |
| 2021/0234174 A1 | 7/2021 | Yoo et al. |

FOREIGN PATENT DOCUMENTS

| | | |
|---|---|---|
| CN | 108140841 | 6/2018 |
| JP | 2005162877 | 6/2005 |
| JP | 2014193986 | 10/2014 |
| JP | 2015128012 | 7/2015 |
| JP | 2018522803 | 8/2018 |
| JP | 2018533175 | 11/2018 |
| JP | 2018534731 | 11/2018 |
| JP | 6870770 | 5/2021 |
| KR | 20170117194 | 10/2017 |
| KR | 101831562 | 2/2018 |
| KR | 1020200021904 | 3/2020 |
| WO | 2014132809 | 9/2014 |
| WO | 2015098116 | 7/2015 |
| WO | 2017010093 | 1/2017 |
| WO | 2017056488 | 4/2017 |
| WO | 2018123624 | 7/2018 |
| WO | 2019066262 | 4/2019 |

OTHER PUBLICATIONS

"Written Opinion of the International Searching Authority (Form PCT/ISA/237) of PCT/JP2021/032214," dated Nov. 16, 2021, with English translation thereof, pp. 1-9.

"Office Action of China Counterpart Application" with English translation thereof, dated Jun. 15, 2022, p. 1-p. 11.

"Notification of Reasons for Revocation of Japan Counterpart Application" with English translation thereof, dated Jul. 7, 2022, p. 1-p. 3.

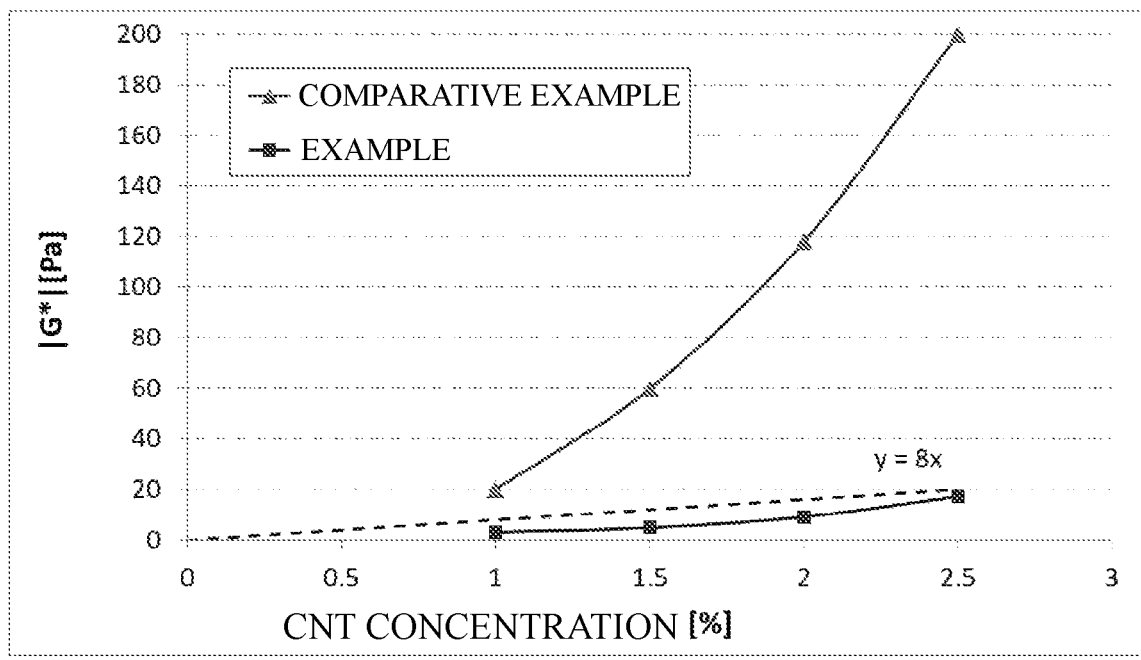

CONDUCTIVE MATERIAL DISPERSION, BINDER RESIN-CONTAINING CONDUCTIVE MATERIAL DISPERSION, SLURRY FOR ELECTRODE FILM, ELECTRODE FILM, AND NON-AQUEOUS ELECTROLYTE SECONDARY BATTERY

CROSS REFERENCE TO RELATED APPLICATIONS

This application is a Continuation of PCT International Application No. PCT/JP2021/032214, filed on Sep. 2, 2021, which claims priority under 35 U.S.C § 119(a) to Patent Application No. 2020-148210, filed in Japan on Sep. 3, 2020, all of which are hereby expressly incorporated by reference into the present application.

TECHNICAL FIELD

An embodiment of the present invention relates to a conductive material dispersion. Other embodiments of the present invention relate to conductive compositions, such as a binder resin-containing conductive material dispersion and a slurry for an electrode film. Still other embodiments of the present invention relate to an electrode film using the above-described conductive composition, and a non-aqueous electrolyte secondary battery including the electrode film.

BACKGROUND ART

Lithium-ion secondary batteries are widely used as batteries for electric vehicles and portable devices. With improvement in performance of electric vehicles and portable devices, the demand for high capacity, high output, small size, and low weight in lithium-ion secondary batteries is increasing year by year.

The capacity of a lithium-ion secondary battery largely depends on a cathode active material and an anode active material, which are main materials. Therefore, various materials for use as electrode active materials in lithium-ion secondary batteries are being actively researched. However, in a case of using the electrode active materials in practical use, the charging capacities of the above-described secondary batteries have all reached a level close to a theoretical value, and any improvement is close to a limit. Meanwhile, by increasing the filling amount of the electrode active material in the electrode film, the charging capacity can easily be increased. Therefore, attempts have been made to reduce the added amount of conductive material and binder resin, which do not directly contribute to the charging capacity.

The conductive material plays a role in forming conductive paths inside the electrode film and connecting the particles of the electrode active material. The above-described conductive paths and connections between the particles require that disconnection due to expansion and contraction of the electrode film is unlikely to occur. In order to maintain conductive paths and connection with a small added amount of the conductive material, it is preferable to use nanocarbons having a large specific surface area as the conductive material. In particular, the use of carbon nanotubes (CNT) is effective for forming efficient conductive networks. However, nanocarbons having a large specific surface area have a strong cohesive force, and thus, there is a problem that it is difficult to disperse the nanocarbons satisfactorily in the slurry for an electrode film and/or in the electrode film.

Based on this background, many methods have been proposed to prepare a conductive material dispersion using various dispersants and to produce a slurry for an electrode film via the conductive material dispersion (for example, refer to Patent Literature 1 to 5).

CITATION LIST

Patent Literature

[Patent document 1]
Japanese Patent Laid-Open No. 2005-162877
[Patent document 2]
Japanese Patent Laid-Open No. 2014-193986
[Patent document 3]
PCT Japanese Translation Patent Publication No. 2018-522803
[Patent document 4]
Japanese Patent Laid-Open No. 2015-128012
[Patent document 5]
Korean Registered Patent No. 10-1831562

SUMMARY OF INVENTION

Technical Problem

For example, Patent Literature 1 and Patent Literature 2 propose a method for improving the initial characteristics and the cycle lifespan of batteries by using a polymer such as polyvinylpyrrolidone or polyvinyl alcohol as a dispersant and dispersing the conductive material in a solvent in advance. According to these methods, by using polyvinylpyrrolidone or polyvinyl alcohol, it is possible to produce a conductive material dispersion in a well-dispersed state. However, the conductive material dispersion has a problem that the dispersed state becomes poor in the process of forming the electrode film and the conductivity deteriorates.

In Patent Literature 3 and Patent Literature 4, conductive material dispersions using hydrogenated nitrile rubber as a dispersant are proposed. However, since these hydrogenated nitrile rubbers have poor dispersibility, it is difficult to form a good conductive network using the above-described conductive material dispersions. Further, since hydrogenated nitrile rubber has high viscosity, there is a problem that it takes a long time to produce a conductive material dispersion, or the obtained conductive material dispersion has poor fluidity and poor handling, and thus, it is industrially difficult to put hydrogenated nitrile rubber into practical use.

Patent Literature 5 proposes a CNT dispersion in which the dispersibility is improved by adding aminoethanol and the like to hydrogenated nitrile rubber. In this CNT dispersion, it is considered that the action of the dispersant was improved by changing the polarity of the solvent. However, the obtained dispersion had high viscosity and still insufficient to form a good conductive network.

In view of this situation, the inventors have intensively studied a method for dispersing a conductive material satisfactorily in a conductive material dispersion and maintaining a good conductive network in an electrode film in order to improve the output and the cycle lifespan of the battery with a small added amount of conductive material. As a result, it was found that, even when a conductive material dispersion in a well-dispersed state could be produced as in the methods proposed in the above-described Patent Literature 1 and 2, in a case where a slurry for an electrode film was prepared by also incorporating an electrode active material, poor dispersion was likely to occur at the preparation stage. It is presumed that such poor dispersion of the slurry for an electrode film makes it impossible to form a good conductive network in the electrode film, and makes it difficult to obtain the desired battery characteristics.

Therefore, in order to form a good conductive network in an electrode film and improve the output and the cycle lifespan of a battery even when the added amount of conductive material is small, it is required to achieve both good dispersibility at the stage of dispersing the conductive material in the conductive material dispersion and stability at the stage of preparing the slurry for an electrode film.

Furthermore, in the lithium-ion secondary batteries, there are also a problem of battery performance degradation due to the reduction and precipitation of metal components on the anode, and a problem related to safety such as excessive heat generation or ignition due to the occurrence of a short circuit. It is conceivable that the causes of performance degradation and short-circuiting due to metal components are (1) incorporation of metal impurities such as copper and iron derived from raw materials such as conductive materials or dispersants, (2) incorporation of metal impurities such as copper and iron in the production process, and (3) reduction and precipitation on the anode after the metal ions contained in the cathode, the current collector, the battery container, and the like are eluted into the electrolytic solution.

In particular, in order to eliminate the causes (1) and (2), it is preferable to provide a process of removing contaminants such as metallic foreign matter during the production of the conductive material dispersion. Methods for removing metallic foreign matter include methods of iron removal with a magnet, filtration, and centrifugation. However, in any method, low viscosity of the conductive material dispersion is necessary to achieve the effect of removing metallic foreign matter. In the conductive material dispersions proposed in the above-described Patent Literature 3 to 5, it was confirmed that the viscosity was high, the metal foreign matter could not be removed efficiently, and the battery performance was degraded by the remaining metal foreign matter.

Here, one embodiment of the present invention provides a conductive material dispersion that can achieve both good dispersibility and stability. Another embodiment of the present invention provides a conductive composition using the above-described conductive material dispersion, more specifically, a binder resin-containing conductive material dispersion. Still another embodiment of the present invention provides a slurry for an electrode film having good dispersibility as a conductive composition using the above-described conductive material dispersion. Furthermore, still other embodiments of the present invention provide an electrode film that can improve the output and the cycle lifespan of a non-aqueous electrolyte secondary battery, and a non-aqueous electrolyte secondary battery having a high output and good cycle lifespan.

Solution to Problem

As a result of the intensive study of the inventors, by using a copolymer A containing a nitrile group-containing monomer unit as a dispersant and by specifying pH of the dispersing liquid, carbon fibers having a strong cohesive force can be satisfactorily dispersed in the solvent. Furthermore, even when preparing a slurry for an electrode film and producing the electrode film, it is possible to maintain a good dispersed state thereof, and to form a good conductive network in the electrode. When the dispersed state of the conductive material dispersion is good, a dispersion having excellent handling properties can be obtained even when a high concentration of carbon fibers is contained, and it is possible to improve the removal efficiency of metallic foreign matter, which is an inhibitor of a conductive network. Accordingly, the rate characteristics and cycle characteristics of the battery can be improved.

In other words, the present invention includes the following embodiments. However, the present invention is not limited to the embodiments described below, and includes various embodiments.

One embodiment of the present invention relates to a conductive material dispersion containing a conductive material containing carbon fibers, a dispersant, and an amide-based organic solvent, in which the above-described dispersant contains a copolymer A containing a nitrile group-containing structural unit and satisfies following conditions.

(I) A pH of the conductive material dispersion is 9.0 or greater.

(II) A phase angle of the conductive material dispersion at a frequency of 1 Hz obtained by dynamic viscoelasticity measurement is 19° or greater, and a complex elastic modulus of the conductive material dispersion obtained by dynamic viscoelasticity measurement is less than 20 Pa.

In the above-described embodiment, it is preferable that a carbon fiber concentration x (% by mass) in the conductive material dispersion and a complex elastic modulus y (Pa) of the conductive material dispersion obtained by dynamic viscoelasticity measurement satisfy relationships of the following expressions (1), (2), and (3).

$$y < 8x \tag{1}$$

$$y < 20 \tag{2}$$

$$0.1 \leq x \leq 10 \tag{3}$$

In the above-described embodiment, it is preferable that the conductive dispersion further contain an inorganic base. In one embodiment, it is preferable that a content of the inorganic base be 1% by mass or greater and 10% by mass or less based on a mass of the copolymer A.

In the above-described embodiment, it is preferable that the inorganic base be a hydroxide of an alkali metal or an alkaline earth metal.

In the above-described embodiment, the content of water in the conductive material dispersion be less than 1% by mass.

Another embodiment of the present invention relates to a conductive composition using the conductive material dispersion according to the above-described embodiment.

In one embodiment, the conductive composition may be a binder resin-containing conductive material dispersion containing the conductive material dispersion according to the above-described embodiment and a binder resin.

In one embodiment, the conductive composition may be a slurry for an electrode film used to form the electrode film. It is preferable that the slurry for an electrode film contain the conductive material dispersion according to the above-described embodiment or the binder resin-containing conductive material dispersion according to the above-described embodiment, and an electrode active material.

Another embodiment of the present invention relates to an electrode film formed using the conductive composition. In one embodiment, it is preferable that the electrode film contain at least one selected from a group consisting of a film formed using the conductive material dispersion according to the above-described embodiment, a film formed using the binder resin-containing conductive material dispersion according to the above-described embodiment, and a film formed using the slurry for an electrode film according to the above-described embodiment.

According to another embodiment of the present invention, there is provided a non-aqueous electrolyte secondary battery having a cathode, an anode, and an electrolyte, in which the electrode film according to the above-described embodiment is used for at least one of the cathode and the anode.

The disclosure of this application is related to the subject described in Japanese Patent Laid-Open No. 2020-148210, filed on Sep. 3, 2020, the contents of which are incorporated herein by reference.

Advantageous Effects of Invention

According to one embodiment of the present invention, it is possible to provide a conductive material dispersion that can achieve both good dispersibility and good stability.

According to another embodiment of the present invention, it is possible to provide a conductive composition containing the above-described conductive material dispersion. More specifically, it is possible to provide a binder resin-containing conductive material dispersion. Further, it is possible to provide a slurry for an electrode film having good dispersibility.

Furthermore, according to other embodiments of the present invention, it is possible to provide an electrode film that can improve the output and the cycle lifespan of a non-aqueous electrolyte secondary battery, and a non-aqueous electrolyte secondary battery having a high output and good cycle lifespan.

BRIEF DESCRIPTION OF DRAWINGS

FIGURE is a graph showing a relationship between a CNT concentration (% by mass) and a complex elastic modulus [G*] (Pa) obtained by dynamic viscoelasticity measurement for dispersions 19 to 22, which are prepared in Examples, and comparative dispersions 7 to 10.

DESCRIPTION OF EMBODIMENTS

Hereinafter, as specific examples of the embodiments of the present invention, a conductive material dispersion, a binder resin-containing conductive material dispersion, a slurry for an electrode film, an electrode film, and a non-aqueous electrolyte secondary battery will be described in detail. However, the present invention is not limited to the embodiments described below. The present invention also includes embodiments that are implemented within the range that does not change the gist.

<Conductive Material Dispersion>

A conductive material dispersion according to one embodiment of the present invention contains a conductive material containing carbon fibers, a dispersant containing a copolymer A, and a dispersion solvent containing an amide-based organic solvent. In other words, the conductive material dispersion contains at least the copolymer A, the amide-based organic solvent, and the carbon fibers. The conductive material dispersion may further contain any component such as bases and acids that can be incorporated into the electrodes of the secondary battery.

<Conductive Material>

The conductive material contains at least carbon fibers, and may contain conductive materials (hereinafter, referred to as other conductive materials) other than carbon fibers, as necessary. Among carbon fibers, it is preferable to include ultrashort carbon fibers such as carbon nanotubes and vapor-phase grown carbon fibers, and more preferable to include carbon nanotubes.

Examples of other conductive materials include metal powders such as those of gold, silver, and copper, silver-plated copper powder, silver-copper composite powder, silver-copper alloy, those of amorphous copper, nickel, chromium, palladium, rhodium, ruthenium, indium, silicon, aluminum, tungsten, molybdenum, and platinum; and inorganic powders coated with these metals. Furthermore, other examples include powders of metal oxides such as silver oxide, indium oxide, tin oxide, zinc oxide, and ruthenium oxide; inorganic powders coated with these metal oxides; and carbon materials such as carbon black and graphite. One type of other conductive materials may be used alone or two or more types of other conductive materials may be used in combination.

In a case of using the other conductive materials described above, carbon black is preferable from the viewpoint of the ability to adsorb the dispersant. In the present specification, the above-described carbon fibers, carbon black, and other carbon-based conductive materials are collectively referred to as "carbon-based conductive materials". It is preferable to use a carbon-based conductive material as a conductive material. However, the conductive material is a substance (material) different from the electrode active material which will be described later.

Carbon nanotubes (CNT) include planar graphite wound into a cylindrical shape, single-wall carbon nanotubes, and multi-wall carbon nanotubes, which may be incorporated together. Single-wall carbon nanotubes have a structure in which a single layer of graphite is wound. Multi-wall carbon nanotubes have a structure in which two or more layers of graphite are wound. The sidewalls of carbon nanotubes may not have a graphite structure. For example, in one embodiment, the carbon nanotubes may be carbon nanotubes with sidewalls having an amorphous structure.

The shape of the carbon nanotubes is not limited. Regarding the shape, such carbon nanotubes may have a variety of shapes, and specific examples thereof include needle-like, cylindrical tubular, fishbone-like (shape of a fishbone or stacked cups), card-like (platelet), and coiled shapes. In the present embodiment, the shape of the carbon nanotubes is preferably needle-like or cylindrical tubular. Carbon nanotubes may have a single shape or a combination of two or more shapes.

Examples of the form of carbon nanotubes include graphite whiskers, filamentous carbon, graphite fibers, ultrafine carbon tubes, carbon tubes, carbon fibrils, carbon microtubes, and carbon nanofibers. Carbon nanotubes may have a single form or a combination of two or more of these forms.

Examples of carbon black includes acetylene black, furnace black, hollow carbon black, channel black, thermal black, and Ketjenblack. In addition, the carbon black may be neutral, acidic, or basic, and oxidized carbon black or graphitized carbon black may be used.

The carbon purity of the carbon-based conductive material can be determined by general CHN elemental analysis, and is expressed as a content (% by mass) of carbon atoms in the carbon-based conductive material. The carbon purity is preferably 90% by mass or greater, more preferably 95% by mass or greater, still more preferably 98% by mass or greater, based on the mass of the carbon-based conductive material (assuming that the mass of the carbon-based conductive material is 100% by mass). It is preferable to have the carbon purity within the above-described range, since in this case it is possible to prevent defects such as dendrite formation due to impurities and the occurrence of a short circuit when used in a secondary battery.

The amount of metal contained in the carbon-based conductive material is preferably less than 10% by mass, more preferably less than 5% by mass, and still more preferably less than 2% by mass, with respect to 100% by mass of the carbon-based conductive material. In particular, examples of the metals contained in the carbon nanotubes include metals and metal oxides used as catalysts in the synthesis of carbon nanotubes. Specific examples thereof include metals such as iron, cobalt, nickel, aluminum, magnesium, silica, manganese, and molybdenum; metal oxides; and complex oxides thereof.

In one embodiment, the carbon-based conductive material may contain 50 ppm or less, more specifically, 20 ppm or less of elemental metallic iron metal in the catalyst used in the production process. In this manner, by significantly reducing the iron content as impurities remaining in the carbon-based conductive material, it is possible to suppress side reactions in the electrode, and for superior conductivity to be exhibited. The content of the metal impurities remaining in the conductive material can be determined using high-frequency inductively coupled plasma (ICP). In one embodiment, the carbon-based conductive material preferably does not contain elemental metallic iron.

A BET specific surface area of the conductive material is preferably 20 to 1,000 $m^2/g$, and more preferably 30 to 500 $m^2/g$.

The content of the carbon fibers in the conductive material dispersion is preferably 0.1% by mass or greater, and more preferably 0.5% by mass or greater, based on the mass of the conductive material dispersion (assuming that the mass of the conductive material dispersion is 100% by mass). The content of the carbon fibers is 10% by mass or less, and more preferably 8% by mass or less, based on the mass of the conductive material dispersion (assuming the mass of the conductive material dispersion is 100% by mass).

In addition, the content of the conductive material contained in the conductive material dispersion is preferably 0.1% by mass or greater, and more preferably 0.5% by mass or greater, based on the mass of the conductive material dispersion (assuming the mass of the conductive material dispersion is 100% by mass). The content of the conductive material is preferably 30% by mass or less, and more preferably 20% by mass or less, based on the mass of the conductive material dispersion (assuming the mass of the conductive material dispersion is 100% by mass).

In a case where the content of the conductive material in the conductive material dispersion is within the above-described range, the conductive material can be present in the dispersion in a good and stable state without sedimentation or gelation. In addition, the content of the conductive material is preferably adjusted appropriately to obtain a conductive material dispersion that exhibits appropriate viscosity, considering the specific surface area of the conductive material and affinity to the dispersion medium.

For example, from the viewpoint of both good dispersibility and stability, the content of the conductive material may be 10% by mass or less, and preferably 8% by mass or less, based on the mass of the conductive material dispersion. In the embodiment of the present invention, since carbon fibers having a high specific surface area (such as CNT) are used as a conductive material, a content within the above-described range is preferable. However, according to the embodiment of the present invention, for example, even in a case where the concentration of the conductive material is high, the copolymer A can achieve both good dispersibility and stability. Therefore, in one embodiment, the content of the conductive material may be 5% by mass or greater and may exceed 10% by mass.

<Dispersant>

The dispersant contains the copolymer A containing a nitrile group-containing structural unit. Since the copolymer A contains at least a nitrile group-containing structural unit, it is possible for excellent flexibility and dispersion stability to be exhibited due to the excellent adsorption force with respect to the dispersed material. Therefore, a good conductive network can be maintained even in an electrode film in which a slurry for an electrode film obtained by incorporating the conductive material dispersion into the electrode active material is formed in a film shape.

The nitrile group-containing structural unit includes a structural unit containing a nitrile group, and preferably includes a structural unit having an alkylene structure in which at least one hydrogen atom is substituted with a nitrile group. More preferably, the nitrile group-containing structural unit is a structural unit consisting only of an alkylene structure in which at least one hydrogen atom is substituted with a nitrile group. The alkylene structure is preferably a linear or branched alkylene structure. The nitrile group-containing structural unit may further be a structural unit having (or consisting only of) an alkyl structure substituted with a nitrile group. The number of nitrile groups contained in the nitrile group-containing structural unit is preferably one.

The nitrile group-containing structural unit may suitably be a structural unit represented by the following general formula (1A).

General formula (1A)

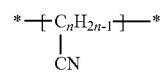

[Formula 1]

In the general formula (1A), n represents an integer of 2 or greater. n is preferably an integer of 6 or less, more preferably an integer of 4 or less, and still more preferably an integer of 3 or less. In particular, n is preferably 2. In the present specification, "*" indicates a bonding part to another structure.

The nitrile group-containing structural unit may suitably be a structural unit represented by the following general formula (1B).

General formula (1B)

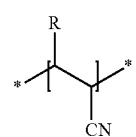

[Formula 2]

In the general formula (1B), R represents a hydrogen atom or a methyl group. R is preferably a hydrogen atom.

The method for introducing the nitrile group-containing structural unit into the copolymer A is not particularly limited, but a method for preparing a copolymer by a polymerization reaction by using a monomer composition containing a nitrile group-containing monomer is preferable. The finally obtained copolymer A contains a nitrile group-containing monomer unit as a nitrile group-containing structural unit.

Examples of the nitrile group-containing monomer that can form a nitrile group-containing structural unit include a monomer that contains a polymerizable carbon-carbon double bond and a nitrile group. Examples thereof include an α,β-ethylenically unsaturated group-containing compound having a nitrile group, and specific example thereof include acrylonitrile and methacrylonitrile. In particular, from the viewpoint of increasing the intermolecular forces between the copolymers A and/or between the copolymer A and the dispersed material (adsorbed material), the nitrile group-containing monomer preferably contains acrylonitrile. One type of nitrile group-containing monomer can be used alone, or two or more types thereof can be used in combination.

The content of the nitrile group-containing structural units is preferably 15% by mass or greater, more preferably 20% by mass or greater, and still more preferably 30% by mass or greater, based on the mass of the copolymer A (that is, in a case where the mass of the copolymer A is 100% by mass). The content of the nitrile group-containing structural units is preferably 50% by mass or less, more preferably 46% by mass or less, and still more preferably 40% by mass or less, based on the mass of the copolymer A (that is, in a case where the mass of the copolymer A is 100% by mass).

By setting the content of the nitrile group-containing structural units within the above-described range, it is possible to control the adsorptivity to the dispersed material and the affinity to the dispersion medium, and to allow the dispersed material to exist stably in the dispersion medium. In addition, it is also possible to control the affinity of the copolymer A to the electrolytic solution, and to prevent defects such as the copolymer A dissolving in the electrolytic solution and increasing the resistance of the electrolytic solution in the battery.

In one embodiment, the copolymer A preferably further contains an aliphatic hydrocarbon structural unit. The aliphatic hydrocarbon structural unit is a structural unit having an aliphatic hydrocarbon structure, and preferably a structural unit consisting only of an aliphatic hydrocarbon structure. The aliphatic hydrocarbon structure is at least a saturated aliphatic hydrocarbon structure and may further be an unsaturated aliphatic hydrocarbon structure. The aliphatic hydrocarbon structure preferably includes at least a linear aliphatic hydrocarbon structure, and may further contain a branched aliphatic hydrocarbon structure.

Examples of aliphatic hydrocarbon structural units include alkylene structural units, alkenylene structural units, alkyl structural units, alkanetriyl structural units, and alkanetetrayl structural units. The aliphatic hydrocarbon structural unit may suitably be at least an alkylene structural unit.

The alkylene structural unit is a structural unit having an alkylene structure, and preferably a structural unit consisting only of an alkylene structure. The alkylene structure is preferably a linear alkylene structure or a branched alkylene structure.

In one embodiment, the alkylene structural unit may suitably be a structural unit represented by the following general formula (2A).

General formula (2A)

[Formula 3]

In the general formula (2A), n represents an integer of 1 or greater. n is preferably an integer of 2 or greater, more preferably an integer of 3 or greater, and particularly preferably an integer of 4 or greater. n is preferably an integer of 6 or less, and more preferably an integer of 5 or less. In particular, n is preferably 4.

In one embodiment, the alkylene structural unit may suitably be a structural unit represented by the following general formula (2B).

General formula (2B)

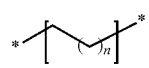

[Formula 4]

In the general formula (2B), n represents an integer of 1 or greater. n is preferably an integer of 2 or less, and more preferably an integer of 3 or less. n is preferably an integer of 5 or less, and more preferably an integer of 4 or less. In particular, n is preferably 3.

In one embodiment, the alkylene structural unit may suitably be a structural unit represented by the following general formula (2C).

General formula (2C)

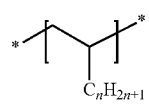

[Formula 5]

In the general formula (2C), n represents an integer of 1 or greater. n is preferably an integer of 4 or less, more preferably an integer of 3 or less, and still more preferably an integer of 2 or less. In particular, n is preferably 2.

A method for introducing the aliphatic hydrocarbon structural unit into the copolymer A is not particularly limited. For example, the following method of (2a) or (2b) can be used.

In the method of (2a), a monomer composition containing a conjugated diene monomer is used, and the copolymer is prepared by the polymerization reaction. The prepared copolymer contains monomer units derived from the conjugated diene monomer. In the present specification, there is a case where the "monomer unit derived from the conjugated diene monomer" is referred to as "conjugated diene monomer unit", and there is a case where the monomer units derived from other monomers are similarly abbreviated. Then, by adding hydrogen to the conjugated diene monomer units, at least some of the conjugated diene monomer units are converted to alkylene structural units. In the following, there is a case where "hydrogen addition" is referred to as "hydrogenation". The finally obtained copolymer A contains a unit obtained by hydrogenating the conjugated diene monomer unit, as an alkylene structural unit.

In addition, the conjugated diene monomer unit contains at least a monomer unit having one carbon-carbon double bond. Examples of the 1,3-butadiene monomer unit, which is a conjugated diene monomer unit, include at least one monomer unit selected from the group consisting of a monomer unit having a cis-1,4 structure, a monomer unit having a trans-1,4 structure, and a monomer unit having a 1,2 structure, or two or more monomer units may be included.

In one embodiment, the conjugated diene monomer units may further be monomer units that do not have a carbon-carbon double bond and that contain branchpoints. In the present specification, "branchpoint" means a branchpoint in a branched polymer. In a case where the conjugated diene monomer unit is a monomer unit containing a branchpoint, the obtained copolymer and copolymer A are branched polymers.

In the method of (2b), a monomer composition containing an α-olefin monomer is used, and the copolymer is prepared by the polymerization reaction. The prepared copolymer contains an α-olefin monomer unit. The finally obtained copolymer A contains an α-olefin monomer unit as an alkylene structural unit.

Among these, the method of (2a) is preferable because it is easier to produce the copolymer therewith.

The number of carbon atoms of the conjugated diene monomer is 4 or greater, and preferably 4 or greater to 6 or less. Examples of the conjugated diene monomer include a conjugated diene compound such as 1,3-butadiene, isoprene, 2,3-dimethyl-1,3-butadiene, and 1,3-pentadiene. Of these, 1,3-butadiene is preferable.

In one embodiment, the alkylene structural unit preferably includes a structural unit obtained by hydrogenating a conjugated diene monomer unit (hydrogenated conjugated diene monomer unit). The alkylene structural unit more preferably includes a structural unit obtained by hydrogenating a 1,3-butadiene monomer unit (hydrogenated 1,3-butadiene monomer unit). One type of conjugated diene monomer can be used alone, or two or more types thereof can be used in combination.

Hydrogenation is preferably a method that makes it possible to selectively hydrogenate the conjugated diene monomer units. Examples of the method of hydrogenation include known methods such as an oil layer hydrogen addition method or a water layer hydrogen addition method.

Hydrogenation can be performed by conventional methods. Hydrogenation can be performed, for example, by treating a copolymer having a conjugated diene monomer unit with hydrogen gas in the presence of a hydrogenation catalyst in a state where the copolymer is dissolved in a suitable solvent. Examples of hydrogenation catalyst include iron, nickel, palladium, platinum, and copper.

In the method of (2b), the number of carbon atoms of the α-olefin monomer is 2 or greater, preferably 3 or greater, and more preferably 4 or greater. The number of carbon atoms of the α-olefin monomer is preferably 6 or less, and more preferably 5 or less. Examples of the α-olefin monomer include α-olefin compounds such as ethylene, propylene, 1-butene, and 1-hexene. One type of α-olefin monomer can be used alone, or two or more types thereof can be used in combination.

In one embodiment, the alkylene structural unit preferably includes one selected from at least the group consisting of a structural unit having a linear alkylene structure and a structural unit having a branched alkylene structure. The alkylene structural unit is more preferably includes one selected from at least the group consisting of a structural unit consisting only of a linear alkylene structure and a structural unit consisting only of a branched alkylene structure. The alkylene structural unit more preferably includes one selected from at least the group consisting of a structural unit represented by the above-described formula (2B) and a structural unit represented by the above-described formula (2C).

The alkylene structural unit may include a structural unit having a linear alkylene structure and a structural unit having a branched alkylene structure. In a case where the alkylene structural unit includes a structural unit having a linear alkylene structure and a structural unit having a branched alkylene structure, the content of the branched alkylene structure is preferably 70% by mass or less, and more preferably 65% by mass or less, based on the mass of the alkylene structural units (that is, in a case where the mass of the alkylene structural units is 100% by mass). In particular, in one embodiment, the above-described content is preferably 20% by mass or less, more preferably 18% by mass or less, and still more preferably 15% by mass or less.

In a case where the copolymer A includes a structural unit having a linear alkylene structure and a structural unit having a branched alkylene structure, the content of the branched alkylene structure is, for example, 1% by mass or greater, may be 5% by mass or greater, and may further be 10% by mass or greater, based on the mass of the alkylene structural units (that is, in a case where the mass of the alkylene structural units is 100% by mass).

In the aliphatic hydrocarbon structural units, the content of the alkylene structural units is preferably 60% by mass or greater based on the total mass of the aliphatic hydrocarbon structural units (that is, in a case where the mass of the aliphatic hydrocarbon structural units is 100% by mass). The above-described content is preferably 70% by mass or greater, more preferably 80% by mass or greater, and still more preferably 90% by mass or greater. The content of the alkylene structural units is, for example, less than 10% by mass, may be 99.5% by mass or less, 99% by mass or less, or 98% by mass or less, based on the total mass of the aliphatic hydrocarbon structural units (that is, in a case where the mass of the aliphatic hydrocarbon structural units is 100% by mass). In one embodiment, the content of alkylene structural units may be 100% by mass.

The content of the aliphatic hydrocarbon structural units is preferably 40% by mass or greater, more preferably 50% by mass or greater, and still more preferably 60% by mass or greater, based on the mass of the copolymer A (that is, in a case where the mass of the copolymer A is 100% by mass). The content of the aliphatic hydrocarbon structural units is preferably less than 85% by mass, more preferably 75% by mass or less, and still more preferably 70% by mass or less, based on the mass of copolymer A (that is, in a case where the mass of copolymer A is 100% by mass).

The copolymer A may further contain any other structural unit. Examples of such structural units include amide group-containing structural units; carboxyl group-containing structural units; alkenylene structural units; alkyl structural units; and structural units containing a branchpoint such as an alkanetriyl structural unit and an alkanetetrayl structural unit. The structural unit containing a branchpoint is a structural unit different from the structural unit having a branched alkylene structure and the structural unit having a branched alkyl structure.

In one embodiment, the copolymer A preferably further contains an amide group-containing structural unit as another structural unit.

The amide group-containing structural unit is a structural unit that contains an amide group. Preferably, the amide group-containing structural unit is a structural unit having an alkylene structure substituted with an amide group. More preferably, the amide group-containing structural unit is a structural unit consisting only of an alkylene structure substituted with an amide group. The alkylene structure is preferably a linear or branched alkylene structure. The amide group-containing structural unit may further be a structural unit having (or consisting only of) an alkyl structure substituted with an amide group. The number of amide groups contained in the amide group-containing structural unit is preferably one.

In one embodiment, the amide group-containing structural unit may suitably be a structural unit represented by the following general formula (3A).

General formula (3A)

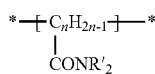

[Formula 6]

In the general formula (3A), n represents an integer of 2 or greater. n is preferably an integer of 6 or less, more preferably an integer of 4 or less, and still more preferably an integer of 3 or less. In particular, n is preferably 2. R' represents, independently, a hydrogen atom or a substituent. The substituent is preferably an alkyl group or a hydroxyalkyl group. It is preferable that at least one R' be a hydrogen atom, and it is more preferable that two be hydrogen atoms.

In one embodiment, the amide group-containing structural unit may suitably be a structural unit represented by the following general formula (3B).

General formula (3B)

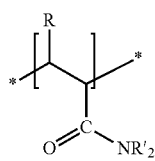

[Formula 7]

In the general formula (3B), R represents a hydrogen atom or a methyl group. R is preferably a hydrogen atom. R' represents, independently, a hydrogen atom or a substituent. The substituent is preferably an alkyl group or a hydroxyalkyl group. It is preferable that at least one R' be a hydrogen atom, and it is more preferable that two be hydrogen atoms.

A method for introducing the amide group-containing structural unit into the copolymer A is not particularly limited. For example, a monomer composition containing an amide group-containing monomer is used, and the copolymer can be prepared by the polymerization reaction. The prepared copolymer contains an amide group-containing monomer unit. The finally obtained copolymer A contains an amide group-containing monomer unit as an amide group-containing structural unit.

Examples of the amide group-containing monomer include monoalkyl(meth)acrylamides such as (meth)acrylamide, N-methyl(meth)acrylamide, N-ethyl(meth)acrylamide, N-propyl(meth)acrylamide, and N-isopropyl(meth)acrylamide; dialkyl(meth)acrylamides such as N,N-dimethyl(meth)acrylamide, and N,N-diethyl(meth)acrylamide; N-(hydroxyalkyl)(meth)acrylamides such as N-(2-hydroxyethyl)(meth)acrylamide, N-(2-hydroxypropyl)(meth)acrylamide, and N-(2-hydroxybutyl)(meth)acrylamide; diacetone(meth)acrylamide; and acryloyl morpholine.

In the present specification, "(meth)acrylic" refers to acrylic or methacrylic. In particular, in one embodiment, the amide group-containing monomer preferably contains one selected from at least the group consisting of acrylamide, methacrylamide, and N,N-dimethylacrylamide. One type of amide group-containing monomer can be used alone, or two or more types thereof can be used in combination.

The content of the amide group-containing structural units is preferably 10% by mass or less, more preferably 5% by mass or less, still more preferably 3% by mass or less, and particularly preferably 1% by mass or less, based on the mass of the copolymer A (that is, in a case where the mass of the copolymer A is 100% by mass). When the content of amide group-containing structural units is equal to or lower than the above-described range, it is possible to prevent the problem of gelation of the conductive material dispersion during storage, which can occur due to extremely strong hydrogen bonding between the copolymers A.

In one embodiment, the copolymer A may further contain a carboxyl group-containing structural unit as another structural unit.

The carboxyl group-containing structural unit is a structural unit that contains a carboxyl group. Preferably, the carboxyl group-containing structural unit is a structural unit containing an alkylene structure substituted with a carboxyl group, and more preferably, the carboxyl group-containing structural unit is a structural unit consisting only of an alkylene structure substituted with a carboxyl group. The alkylene structure is preferably a linear or branched alkylene structure. The carboxyl group-containing structural unit may further be a structural unit having (or consisting only of) an alkyl structure substituted with a carboxyl group. The number of carboxyl groups contained in the carboxyl group-containing structural unit is preferably one or two. By making the carboxyl group-containing structural unit contained in the copolymer A, it is possible to improve the adsorption force to the dispersed material, to reduce the viscosity of the conductive material dispersion, and to improve the dispersion efficiency.

The carboxyl group-containing structural unit may suitably be a structural unit represented by the following general formula (4A).

General formula (4A)

[Formula 8]

In the general formula (4A), n represents an integer of 2 or greater. n is preferably an integer of 6 or less, more preferably an integer of 4 or less, and still more preferably an integer of 3 or less. In particular, n is preferably 2.

The carboxyl group-containing structural unit may suitably be a structural unit represented by the following general formula (4B).

General formula (4B)

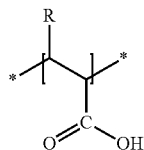

[Formula 9]

In the general formula (4B), R represents a hydrogen atom or a methyl group. R is preferably a hydrogen atom.

The content of the carboxyl group-containing structural units is preferably less than 1% by mass, more preferably 0.5% by mass or less, and still more preferably 0.3% by mass or less, based on the mass of the copolymer A (that is, in a case where the mass of the copolymer A is 100% by mass). When the content of carboxyl group-containing structural units is lower than (equal to or lower than) the above-described range, it is possible to prevent the problem of gelation (will be described later) of the conductive material dispersion during storage, which can occur due to extremely strong hydrogen bonding between the copolymers A.

For example, in a case of obtaining the copolymer A through the above-described method of (2a), in the copolymer A, the conjugated diene monomer unit is a monomer unit that does not have a carbon-carbon double bond in the unit, and there is a case where the conjugated diene monomer is introduced into the molecule as a monomer unit containing a branchpoint. In this case, the finally obtained copolymer A is a branched polymer and may contain the conjugated diene monomer unit as an aliphatic hydrocarbon structural unit containing a branchpoint such as an alkanetriyl structural unit and an alkanetetrayl structural unit.

In a case where the aliphatic hydrocarbon structural unit contains a structural unit containing a branchpoint, the copolymer A is a branched polymer. The branched polymer may be a reticulated polymer. The copolymer A, which contains the structural unit containing a branchpoint, can be adsorbed three-dimensionally onto the dispersed material, and thus, it is possible to more easily improve dispersibility and stability.

Preferable embodiments of the copolymer A include the following.

(A1) A copolymer A in which the total content of the aliphatic hydrocarbon structural units and the nitrile group-containing structural units contained in the copolymer A is 80% by mass or greater and 100% by mass or less, based on the mass of the copolymer A. The total content of each of the above-described structural units is preferably 90% by mass or greater, more preferably 95% by mass or greater, and still more preferably 98% by mass or greater.

(A2) A copolymer A in which the total content of the aliphatic hydrocarbon structural units, the nitrile group-containing structural units, and the amide group-containing structural units contained in the copolymer A is 80% by mass or greater and 100% by mass or less, based on the mass of the copolymer A. The total content of each of the above-described structural units is preferably 90% by mass or greater, more preferably 95% by mass or greater, and still more preferably 98% by mass or greater.

(A3) A copolymer A in which the total content of the aliphatic hydrocarbon structural units, the nitrile group-containing structural units, the amide group-containing structural units, and the carboxyl group-containing structural units contained in the copolymer A is 80% by mass or greater and 100% by mass or less, based on the mass of the copolymer A. The total content of each of the above-described structural units is preferably 90% by mass or greater, more preferably 95% by mass or greater, and still more preferably 98% by mass or greater.

In the present specification, the content of each of the structural units in the copolymer A can be determined by using the amount of monomer used, and nuclear magnetic resonance (NMR) and/or infrared spectroscopy (IR) measurements.

In the embodiment of the present invention, the Mooney viscosity ($ML_{1+4}$, 100° C.) of the copolymer A is preferably 70 or less. The copolymer A having Mooney viscosity ($ML_{1+4}$, 100° C.) of 70 or less can more easily improve the dispersibility, stability, and handling of dispersions containing carbon fiber as a conductive material.

The "Mooney viscosity ($ML_{1+4}$, 100° C.)" in the present invention can be measured at a temperature of 100° C. in accordance with JIS K6300-1.

In one embodiment, the Mooney viscosity of the copolymer A is preferably 70 or less, preferably 65 or less, more preferably 60 or less, and still more preferably 50 or less. In a case where the Mooney viscosity of the copolymer A is extremely high, the adsorption force of the copolymer A to the carbon fiber surface decreases. Therefore, it is not possible to disperse the carbon fibers with a strong cohesive force, and there is a concern that it is difficult to prepare a uniform conductive material dispersion. In addition, the obtained conductive material dispersion has high viscosity, it is not possible to efficiently remove the metallic foreign matter incorporated from raw materials by methods of iron removal with a magnet, filtration, and centrifugation, and there is a concern that battery performance deteriorates due to remaining metallic foreign matter.

The method of adjusting the Mooney viscosity of the copolymer A is not particularly limited. For example, it is possible to adjust the above-described Mooney viscosity by changing the composition (for example, type, content, and hydrogenation rate of the structural unit), structure (for example, linearity), and molecular weight of the copolymer A. In addition, it is also possible to adjust the above-described Mooney viscosity by changing the conditions (for example, polymerization temperature and amount of molecular weight modifier) or the like when preparing the copolymer A.

Examples of the molecular weight modifier that can be used when preparing the copolymer A include alkyl mercaptans such as octyl mercaptan, nonyl mercaptan, decyl mercaptan, dodecyl mercaptan, and 3-mercapto-1,2-propanediol; thioglycolic acid esters such as octyl thioglycolate, nonyl thioglycolate, and 2-ethylhexyl thioglycolate; 2,4-diphenyl-4-methyl-1-pentene; 1-methyl-4-isopropylidene-1-cyclohexene; alpha-Pinene; and beta-Pinene.

The polymerization reaction used to prepare the copolymer A is preferably an emulsion polymerization reaction, and a conventional emulsion polymerization method can be used. The polymerization agents such as emulsifiers (surfactants) used in emulsion polymerization, polymerization initiators, chelating agents, oxygen scavengers, and molecular weight modifiers, are not particularly limited, and each of these agents can be used as previously known. For example, an anionic emulsifier or an anionic and nonionic emulsifier is usually used as an emulsifier.

Examples of the anionic emulsifier include fatty acid salts such as potassium tallow acid, partially hydrogenated potassium tallow acid, potassium oleate, and sodium oleate; resin acid salts such as potassium rosinate, sodium rosinate, hydrogenated potassium rosinate, and hydrogenated sodium rosinate; and alkylbenzene sulfonates such as sodium dodecylbenzenesulfonate.

Examples of the nonionic emulsifier include a polyethylene glycol ester type emulsifier, a polypropylene glycol ester type emulsifier, and a Pluronic (registered trademark) type emulsifier such as block copolymers of ethylene oxide and propylene oxide.

Examples of the polymerization initiator include pyrolytic initiators such as persulfates (for example, potassium persulfate and ammonium persulfate); organic peroxides such as t-butyl hydroperoxide, cumene hydroperoxide, diisopropylbenzene hydroperoxide, octanoyl peroxide, and 3,5,5-trimethylhexanoyl peroxide; azo compounds such as azobisisobutyronitrile; and redox-based initiators composed of these and a reducing agent such as divalent iron ions. Among these, the redox-based initiator is preferable. The amount of initiator used may be in the range of 0.01 to 10% by mass, for example, based on the total mass of the monomer.

The emulsion polymerization reaction may be either a continuous type or a batch type. The polymerization temperature can be any temperature from low to high temperature polymerization. In one embodiment, the polymerization temperature is preferably 0 to 50° C., and more preferably 0 to 35° C. In addition, the method of adding the monomer (batch addition, split addition, and the like), polymerization time, polymerization conversion rate, and the like are also not particularly limited. A conversion rate is preferably 85% by mass or greater, and more preferably 90% or greater.

The weight average molecular weight of the copolymer A is preferably 5,000 or greater, more preferably 10,000 or greater, and still more preferably 50,000 or greater. The weight average molecular weight of the copolymer A is preferably 400,000 or less, more preferably 350,000 or less, and still more preferably 300,000 or less.

In a case where the weight average molecular weight of the copolymer A is 5,000 or greater and 400,000 or less, the adsorptivity to the dispersed material and the affinity to the dispersion medium become good, and the stability of the dispersion tends to be improved.

The weight average molecular weight is a weight average molecular weight in polystyrene conversion and can be measured by gel permeation chromatography (GPC). Specifically, the weight average molecular weight can be measured by the method described in the examples.

In the conductive material dispersion according to one embodiment of the present invention, the dispersant contains at least the copolymer A. The dispersant may further contain any polymer, any copolymer, and the like. The content of the copolymer A in the dispersant is preferably 50% by mass or greater, more preferably 80% by mass or greater, and still more preferably 90% by mass or greater. In one embodiment, the content of the copolymer A in the dispersant may be 100% by mass. In other words, in this case, the dispersant consists only of the copolymer A.

In one embodiment, the dispersion solvent contained in the conductive material dispersion contains an amide-based organic solvent. In one embodiment, the dispersion solvent preferably consists of a substantially amide-based organic solvent. In one embodiment, the dispersion solvent is not particularly limited to the amide-based organic solvent, but preferably a solvent that can dissolve the copolymer A. The dispersion solvent is preferably a solvent consisting of any one of the amide-based organic solvents, or an incorporated solvent consisting of any two or more of the amide-based organic solvents.

Examples of the amide-based organic solvent include N-methyl-2-pyrrolidone (NMP), N-ethyl-2-pyrrolidone (NEP), N,N-dimethylformamide, N,N-dimethylacetamide, N,N-diethylacetamide, and N-methylcaprolactam. In particular, the amide-based organic solvent more preferably contains one selected from at least the group consisting of N-methyl-2-pyrrolidone and N-ethyl-2-pyrrolidone.

Preferably, the conductive material dispersion substantially does not contain water. In the present specification, "substantially does not contain water" means that no water is intentionally added. In one embodiment, the content of water in the conductive material dispersion is preferably less than 1% by mass. In addition, in one embodiment, the content of water in the conductive material dispersion is preferably less than 5% by mass, and more preferably less than 1% by mass, based on the mass of the copolymer A. When a large amount of water is contained, the adsorptivity of the copolymer A to the dispersed material is reduced, and there is a concern that it is difficult to keep the dispersed material stable in the dispersion solvent. By setting the water content in the above-described range, it is possible to prevent the problem of gelation of the conductive material dispersion during storage.

The conductive material dispersion according to one embodiment of the present invention substantially does not contain water, as described above. However, in measuring "pH" of the conductive material dispersion, water is added to the conductive material dispersion and the solid content concentration is adjusted. For example, the "pH" of the conductive material dispersion specified in the present invention refers to a value measured by adding water to the conductive material dispersion, preparing a sample such that the solid content concentration after the addition of water is 50% when the solid content concentration before the addition of water is 100%, and using a general pH meter on this sample. The "pH" of the conductive material dispersion can be measured, for example, by the following method.

First, a sample is prepared by adding water to the conductive material dispersion having a solid content concentration of 5%, while stirring with a dispenser or the like, such that the solid content concentration of the conductive material dispersion is 2.5%. After the sample is uniformly stirred, the pH of the conductive material dispersion can be measured at 25° C. by using a benchtop pH meter (SevenCompact 5220 Expert Pro manufactured by Mettler Toledo).

The conductive material dispersion according to one embodiment of the present invention is characterized in that the pH measured as described above is 9.0 or greater. The pH of the conductive material dispersion is preferably 9.0 or greater and 11.0 or less, and more preferably 9.0 or greater and 10.5 or less. When the pH exceeds the above-described range, problems such as corrosion of various raw materials and exterior materials or gelation of the binder resin in the battery are likely to occur.

The pH of the conductive material dispersion can be adjusted by adding a base or by using a conductive material that exhibits basicity. In a case of adjusting the pH by adding a base, a compound having low solubility in the electrolytic solution can be used as the base to be added. Specifically, one selected from at least the group consisting of an inorganic base and an organic hydroxide (organic base) can be used.

Example of the inorganic base include chlorides, hydroxides, carbonates, nitrates, sulfates, phosphates, tungstates, vanadates, molybdates, niobates, or borates of alkali metals or alkaline earth metals; and ammonium hydroxide. Among these, from the viewpoint that cations can be easily supplied, hydroxides of alkali metals or alkaline earth metals are preferable. Examples of the hydroxide of alkali metals include lithium hydroxide, sodium hydroxide, and potassium hydroxide. Examples of the hydroxide of alkaline earth metals include calcium hydroxide and magnesium hydroxide. Among these, it is preferable to use one selected from at least the group consisting of lithium hydroxide, sodium hydroxide, and potassium hydroxide. In addition, the metal contained in the inorganic base may be a transition metal.

The organic hydroxide is a salt containing an organic cation and a hydroxide ion. Examples of the organic hydroxide include trimethyl-2-hydroxyethylammonium hydroxide, tetramethylammonium hydroxide, cetyltrimethylammonium hydroxide, hexadecyltrimethylammonium hydroxide, trimethylphenylammonium hydroxide, 3-trifluoromethyl-phenyltrimethylammonium hydroxide, and benzyltrimethylammonium hydroxide.

Among these, it is particularly preferable to use one selected from at least the group consisting of trimethyl-2-hydroxyethylammonium hydroxide and tetramethylammonium hydroxide.

Meanwhile, examples of the compound having high solubility in the electrolytic solution include methylamine, ethylamine, propylamine, butylamine, hexylamine, octylamine, dioctylamine, trioctylamine, aminoethanol, aminopropanol, aminobutanol, and 2-methoxyethylamine.

Since these compounds dissolve in the electrolytic solution, there is a concern that the battery performance deteriorates. In addition, since these compounds are likely to decompose, there is a possibility that the decomposition products remain in the coating film, and there is a concern that the presence in the battery reduce the initial capacity. Therefore, compounds having high solubility in the electrolytic solution may be used, but it is preferable to use the compounds within a range that does not deteriorate various properties.

The amount of base used is preferably 1% by mass or greater, more preferably 2% by mass or greater, and still more preferably 3% by mass or greater, based on the mass of the copolymer A. The amount of base used is preferably 20% by mass or less, more preferably 15% by mass or less, and still more preferably 10% by mass or less, based on the mass of the copolymer. From this point of view, in one embodiment, the conductive material dispersion may further contain the base having 1% by mass or greater and 10% by mass or less, based on the mass of the copolymer A. In one embodiment, the base is preferably an inorganic base.

When the amount of base used is extremely small, the obtained conductive material dispersion tends to have high viscosity. When the amount used is extremely large, there is a concern that the stability of the obtained conductive material dispersion becomes poor, and further, this may cause corrosion of the dispersing device and/or the inside of the battery.

The reason why the dispersibility is improved by adjusting the pH to a predetermined value is not clear, but the following factors are considered.

(1) Dispersibility of the copolymer A is improved.

By adding a base for the purpose of adjusting the pH to a predetermined value, the nitrile group in the nitrile group-containing structural unit of the copolymer A is hydrolyzed to form an amide group. When the copolymer A contains an amide group-containing structural unit, the adsorption force to the dispersed material is improved. Furthermore, the amide group can form strong hydrogen bonds. Therefore, when the copolymer A contains an amide group-containing structural unit, a cross-linked structure by hydrogen bonding is introduced into the molecule of the copolymer A, three-dimensional adsorption to the dispersed material is possible, and it is possible to obtain a dispersion having excellent stability as well as dispersibility.

(2) Solution viscosity of the copolymer A decreases.

The copolymer A is used by dissolving the copolymer A in a solvent. Therefore, as the viscosity of the copolymer A solution decreases, the dispersant easily enters the inside of the carbon fibers having a strong cohesive force, and the uniform dispersion can be obtained.

(3) Wettability of carbon fibers is improved.

In a case of dispersing carbon fibers, the carbon fibers can be present as a dispersion by wetting the carbon fibers with a solvent to reduce the cohesive force between the carbon fibers, and then crushing and stabilizing the carbon fibers. Carbon fiber has lower wettability than other conductive materials, and thus, it is necessary to perform pre-treatment to improve wettability, such as chemical treatment or mechanical crushing of carbon fibers, but there is a concern that these treatments reduce conductivity. In contrast, by adjusting the pH to a predetermined value, the wettability can be dramatically improved without impairing the conductivity of carbon fibers.

The dispersibility of the conductive material in the conductive material dispersion can be indicated by the phase angle and the complex elastic modulus obtained by dynamic viscoelasticity measurement. The phase angle means the phase shift of the stress wave in a case where the strain applied to the conductive material dispersion is a sine wave. In a case of a purely elastic body, the sine wave with the same phase as that of the applied strain is achieved, and thus, the phase angle becomes 0°. Meanwhile, in a case of a purely viscous body, the stress wave is advanced by 90°.

In a typical sample for viscoelasticity measurement, a sine wave having a phase angle greater than 0° and less than 90° is obtained. When the dispersibility of the conductive material in the conductive material dispersion is good, the phase angle becomes close to 90°, which means a purely viscous body. In addition, the complex elastic modulus of the conductive material dispersion becomes smaller as the dispersibility of the conductive material becomes is good and the viscosity of the conductive material dispersion is low.

The phase angle and the complex elastic modulus obtained by dynamic viscoelasticity measurement depend on the concentration of the conductive material in the dispersion. In a case of using high specific surface area carbon fibers (such as CNT) as a conductive material, as the content of the conductive material containing carbon fibers decreases, the obtained dispersion becomes close to the purely viscous body, and thus, the phase angle becomes close to 90°. On the contrary, in a dispersion containing a conductive material containing carbon fibers at a high concentration, it is difficult to uniformly disperse the conductive material, and the phase angle of the obtained dispersion is less than 19°. According to the embodiment of the present invention, both the good dispersibility and stability can be achieved by using the copolymer A. Therefore, in one embodiment, even in a case where the concentration of the conductive material is high, it is possible to obtain a conductive material dispersion with a phase angle of 19° or greater at a frequency of 1 Hz.

In one embodiment, the complex elastic modulus of the conductive material dispersion obtained by dynamic viscoelasticity measurement may be preferably less than 20 Pa, more preferably 10 Pa or less, and still more preferably 5 Pa or less. The complex elastic modulus of the conductive material dispersion is preferably 0.01 Pa or greater, more preferably 0.05 Pa or greater, and still more preferably 0.1 Pa or greater. In addition, the phase angle of the conductive material dispersion at a frequency of 1 Hz is 19° or greater, more preferably 30° or greater, and still more preferably 45° or greater. The phase angle at a frequency of 1 Hz is preferably 90° or less, more preferably 85° or less, and still more preferably 80° or less. The complex elastic modulus and the phase angle can be measured by the methods described in the examples.

The complex elastic modulus of the conductive material dispersion according to one embodiment of the present invention decreases because the aggregation of the carbon fibers is loosened by the effect of the dispersant containing the copolymer A. In one embodiment, it is preferable that a carbon fiber concentration x (% by mass) in the conductive material dispersion and a complex elastic modulus y (Pa) of the conductive material dispersion obtained by dynamic viscoelasticity measurement satisfy relationships of the following expressions (1), (2), and (3).

$$y<8x \quad (1)$$

$$y<20 \quad (2)$$

$$0.1 \leq x \leq 10 \quad (3)$$

In other words, from the above-described expressions (1) and (2), the complex elastic modulus y of the conductive material dispersion obtained by dynamic viscoelasticity measurement is less than 20 Pa, and preferably satisfy $y<8x$. In addition, from the above-described expression (3), the carbon fiber concentration x (% by mass) is preferably in the range of $0.1 \leq x \leq 10$.

As described above, the values of the phase angle and the complex elastic modulus can be used to determine the dispersibility of the conductive material. From this point of view, examples of a preferable method for producing the conductive material dispersion include a producing method including the following process I and process II. According to this producing method, it is possible to obtain a conductive material dispersion that can achieve both good dispersibility and stability.

(Process I) A process of incorporating a conductive material containing carbon fibers, a dispersant containing the copolymer A, and a dispersion medium.

(Process II) A process of performing dispersion processing after the process I and obtaining a dispersion, of which rheometer measurement results exhibit that the phase angle at a frequency of 1 Hz is 19° or greater and the complex elastic modulus is less than 20 Pa.

In a case where carbon nanotubes (CNT) are contained as a conductive material, the physical properties can be different depending on the structure, crystallinity, and form of the unit layers that configure the CNT, as well as the structure or shape of the CNT made up of the above-described unit layers and the content of metal elements contained in the CNT. However, according to the embodiment of the present invention, the desired physical properties can be obtained by controlling the phase angle of the conductive material dispersion to the above-described value by using the dispersant containing the copolymer A.

The method for producing the conductive material dispersion is not particularly limited. As an example, a conductive material dispersion can be obtained by incorporating a dispersant, a solvent, and a conductive material, and dispersing the conductive material in the solvent. In this producing method, in addition to the dispersant, the solvent, and the conductive material, any component may be incorporated. As another example, a conductive material dispersion can be obtained by incorporating the conductive material and dispersing the conductive material in the solvent after dissolving the dispersant in the solvent. In this producing method, in addition to the dispersant, the solvent, and the conductive material, any component such as an additional solvent may be incorporated. In a case of incorporating the solvent, it is preferable to use the same solvent as the solvent that dissolves the dispersant. The order in which the dispersant or the conductive material is added to the container is not particularly limited. At some point of time in the process of dispersing the conductive material, the dispersant is preferably present together with the conductive material.

Examples of the dispersion method include methods of using various dispersion means such as a disperser, a homogenizer, a Silverson mixer, a kneader, a two-roll mill, a three-roll mill, a ball mill, a horizontal sand mills, a vertical sand mill, an annular bead mill, an attritor, a planetary mixer, or a high-pressure homogenizer.

In one embodiment, it is preferable to provide a process of removing contaminants such as metallic foreign matter during the production of the conductive material dispersion. In many cases, the conductive materials containing carbon fibers and the dispersant containing the copolymer A contain metallic foreign matter derived from these production processes (as line contaminants or catalysts). The removal of these metallic foreign matter is extremely important to prevent short circuits in the battery. Metallic foreign matter refers to iron, nickel, chromium, and the like, which are present in particulate form in the conductive material dispersion, and does not include those which are present in a dissolved metal ion state.

According to the embodiment of the present invention, the effect of the dispersant containing the copolymer A loosens the aggregation of carbon fibers and lowers the viscosity of the obtained conductive material dispersion. Therefore, compared to a case where the copolymer A is not contained as a dispersant, metallic foreign matter can be more efficiently removed even in a case where the content of carbon fibers in the conductive material dispersion is high.

In the process of removing metallic foreign matter, the method of removing particulate metallic foreign matter from the conductive material dispersion is not particularly limited. For example, a removal method by filtration using a filter, a removal method by a vibrating sieve, a removal method by centrifugal separation, or a removal method by a magnetic force, can be employed. Among these, the method of removing metallic foreign matter such as iron, nickel, and chromium by a magnetic force is preferable because the metallic foreign matter has magnetism. In one embodiment, a method that combines the removal process by a magnetic force with the removal process by filtration using a filter is more preferable.

The type of metallic foreign matter contained in the conductive material dispersion is not particularly limited. Specific examples thereof include metals such as iron, cobalt, nickel, chromium, aluminum, magnesium, silica, manganese, and molybdenum; metal oxides of these metals; and complex oxides of these metals.

The removal method by a magnetic force may be a method that can remove metallic foreign matter, and is not particularly limited. Considering the productivity and removal efficiency, a removal method by disposing a magnetic filter in the production line of the conductive material dispersion and making the conductive material dispersion pass therethrough is preferable.

The process of removing metallic foreign matter from the conductive material dispersion by a magnetic filter is preferably performed by making the conductive material dispersion pass through the magnetic filter that forms a magnetic field with a magnetic flux density of 1,000 gauss or greater. When the magnetic flux density is low, the removal efficiency of the metal component is reduced. Therefore, in one embodiment, the magnetic flux density is preferably 5,000 gauss or greater. Considering the removal of weakly magnetic stainless steel, the magnetic flux density is more preferably 10,000 gauss or greater, most preferably 12,000 gauss or greater.

When the magnetic filter is disposed in the production line, it is preferable to put a process of removing coarse foreign matter or metal particles by using a filter, such as a cartridge filter, upstream of the magnetic filter. This is because there is a concern that coarse metal particles pass through the magnetic filter, depending on the flow rate of being filtered. In addition, although the magnetic filter can be effective even with only a single filtration, a circulation system is more preferable. This is because the circulation system improves the removal efficiency of metal particles.

In a case where a magnetic filter is disposed in the production line of the conductive material dispersion, the location of the magnetic filter is not particularly limited. For example, in a case where there is a filtration process by a filtration filter immediately before the container is filled with the conductive material dispersion, that is, before filling the container, it is preferable to put the magnetic filter in front of the filtration filter. This is to prevent contamination of the product in a case where metal components are desorbed from the magnetic filter.

After drying the conductive material dispersion, the content of metal impurities remaining in the conductive material can be analyzed using high-frequency inductively coupled plasma (ICP). The metal content consisting of iron, nickel, and chromium detected by ICP analysis includes metallic foreign matter present in particulate form, as well as those which are present in a dissolved metal ion state. In other words, the metal content of the conductive material dispersion that has passed through the removal process of metal foreign matter includes the metal foreign matter that could not be completely removed and those which are present in a dissolved metal ion state.

In one embodiment, the metal content consisting of iron, nickel, and chromium contained in the conductive material dispersion is preferably 50 ppm or less, and more preferably 20 ppm or less. By setting the metal content in the above-described range, it is possible to suppress side reactions in the electrode, and to easily obtain more excellent conductivity. The amount of metal can be measured using the method described in the examples.

Another embodiment of the present invention relates to a conductive composition using the conductive material dispersion according to the above-described embodiment. In one embodiment, the conductive composition may be a binder resin-containing conductive material dispersion. In one embodiment, the conductive composition may be a slurry for an electrode film. Hereinafter, these embodiments are described in detail.

<Binder Resin-Containing Conductive Material Dispersion>

The binder resin-containing conductive material dispersion contains the binder resin and the conductive material dispersion according to the above-described embodiment. In other words, the binder resin-containing conductive material dispersion contains at least the above-described dispersant, solvent, conductive material, and binder resin. Further, in other words, the binder resin-containing conductive material dispersion contains at least the copolymer A, the amide-based organic solvent, the carbon fibers, and the binder resin. The binder resin-containing conductive material dispersion may further contain any component such as a base and an acid.

In one embodiment, the binder resin-containing conductive material dispersion can be produced by incorporating the binder resin and the conductive material dispersion according to the above-described embodiment. During the production, any component may further be incorporated together with the binder resin and the conductive material dispersion. During the production of the binder resin-containing conductive material dispersion, a process of removing contaminants such as metallic foreign matter described for the above-described conductive material dispersion may be provided.

The binder resin is a resin that can bond between substances such as an electrode active material and a conductive material. In the present specification, the binder resin is a resin different from the copolymer A. In other words, the binder resin is selected from resins except for the copolymer A.

Examples of the binder resin include polymers or copolymers containing structural units such as ethylene, propylene, vinyl chloride, vinyl acetate, vinyl alcohol, maleic acid, acrylic acid, acrylic acid ester, methacrylic acid, methacrylic acid ester, acrylonitrile, styrene, vinyl butyral, vinyl acetal, and vinyl pyrrolidone; resins such as polyurethane resin, polyester resin, phenol resin, epoxy resin, phenoxy resin, urea resin, melamine resin, alkyd resin, acrylic resin, formaldehyde resin, silicon resin, and fluorocarbon resin; cellulose resin such as carboxymethyl cellulose; rubbers such as styrene-butadiene rubber and fluororubber; and conductive resins such as polyaniline and polyacetylene. In addition, these modified products, mixtures, or copolymers may be used.

Among these, in a case of forming a cathode film, a polymer or a copolymer having fluorine atoms in the molecules can be suitably used as a binder resin from the viewpoint of resistance. For example, polyvinylidene fluoride, polyvinyl fluoride, tetrafluoroethylene, and the like are preferable. In addition, in a case of forming an anode film, carboxymethyl cellulose, styrene-butadiene rubber, polyacrylic acid, and the like can be suitably used as a binder resin from the viewpoint of good adhesion.

The weight average molecular weight of the binder resin is preferably 10,000 to 2,000,000, more preferably 100,000 to 1,000,000, and still more preferably 200,000 to 1,000,000.

The content of the copolymer A contained in the binder resin-containing conductive material dispersion (BD) is preferably 0.1 to 200% by mass, more preferably 1 to 100% by mass, and still more preferably 2 to 50% by mass, based on the mass of the conductive material in the above-described dispersion (BD) (assuming that the mass of the conductive material is 100% by mass).

The content of the conductive material contained in the binder resin-containing conductive material dispersion (BD) is preferably 0.05 to 30% by mass, and more preferably 0.1 to 20% by mass, based on the mass of the above-described dispersion (BD) (assuming that the mass of the above-described dispersion (BD) is 100% by mass).

The content of the binder resin contained in the binder resin-containing conductive material dispersion (BD) is preferably 0.05 to 25% by mass, and more preferably 0.1 to 15% by mass, based on the mass of the above-described dispersion (BD) (assuming that the mass of the above-described dispersion (BD) is 100% by mass).

The binder resin-containing conductive material dispersion contains a solvent. The solvent is not particularly limited, but for example, the solvents illustrated in the description of the dispersant composition of the conductive material dispersion can be used. In addition, it is preferable to use the same solvent as the solvent contained in the conductive material dispersion.

<Slurry for Electrode Film>

In one embodiment, the above-described conductive material dispersion or the conductive composition using the above-described conductive material dispersion can be suitably used as a material to form an electrode film. Therefore, one embodiment of the present invention relates to a slurry for an electrode film. In addition, another embodiment of the present invention relates to a method for preparing a slurry for an electrode film. Hereinafter, these embodiments are described in detail.

The above-described slurry for an electrode film contains the conductive material dispersion or the binder resin-containing conductive material dispersion according to the above-described embodiment, and the electrode active material. In other words, in one embodiment, the slurry for an electrode film contains at least the conductive material dispersion according to the above-described embodiment and the electrode active material. In other words, in another embodiment, the slurry for an electrode film contains at least the binder resin-containing conductive material dispersion according to the above-described embodiment and the electrode active material. Further, in other words, the slurry for an electrode film contains at least the copolymer A, the carbon fibers, the solvent, and the electrode active material. The slurry for an electrode film may further contain any component such as a binder resin, a base, and an acid. In the present specification, there is a case where "slurry" is referred to as "mixture slurry".

The electrode active material is a material that serves as the basis for the battery reaction. The electrode active material is divided into a cathode active material and an anode active material based on the electromotive force.

The cathode active material is not particularly limited, but materials that can reversibly dope or intercalate lithium ions can be used. Examples of the cathode active material include metal compounds such as metal oxides and metal sulfides. Specific examples thereof include inorganic compounds such as oxides of transition metals (for example, Fe, Co, Ni, and Mn), complex oxides with lithium, and transition metal sulfides. More specific examples thereof include transition metal oxide powders such as MnO, $V_2O_5$, $V_6O_{13}$, and $TiO_2$; composite oxide powders of lithium and transition metals such as layered lithium nickelate, lithium cobalt oxide, lithium manganate, and lithium manganate with spinel structure; lithium iron phosphate materials, which are phosphate compounds with olivine structure; and transition metal sulfide powders such as $TiS_2$ and FeS. The cathode active material is preferably a substance that contains at least Ni. One type of cathode active material can be used alone or plural types thereof can be used in combination.

As the anode active material, materials that can reversibly dope or intercalate lithium ions can be used. Examples of the anode active material include alloys such as metal Li, tin alloy which is an alloy thereof, silicon alloy, and lead alloy; metal oxides such as $Li_xFe_2O_3$, $Li_xFe_3O_4$, $Li_xWO_2$ (x is a number of 0<x<1), lithium titanate, lithium vanadate, and lithium silicate; conductive polymers such as polyacetylene and poly-p-phenylene; carbonaceous powders such as artificial graphite (for example, highly graphitized carbon materials) and natural graphite; and carbon-based materials such as resin-fired carbon materials. One type of anode active material can be used alone or plural types thereof can be used in combination.

The content of the copolymer A in the slurry for an electrode film is preferably 0.01 to 10% by mass, and more preferably 0.05 to 5% by mass, based on the mass of the electrode active material (assuming that the mass of the electrode active material is 100% by mass).

The content of the conductive material in the slurry for an electrode film is preferably 0.01 to 10% by mass, more preferably 0.02 to 5% by mass, and still more preferably 0.03 to 3% by mass, based on the mass of the electrode active material (assuming that the mass of the electrode active material is 100% by mass).

In one embodiment, the slurry for an electrode film may contain a binder resin. In this case, the content of the binder resin in the slurry for an electrode film is preferably 0.1 to 30% by mass, more preferably 0.5 to 20% by mass, and still more preferably 1 to 10% by mass, based on the mass of the electrode active material (assuming that the mass of the electrode active material is 100% by mass).

In one embodiment, the solid content amount in the slurry for an electrode film is preferably 30 to 90% by mass, more preferably 30 to 80% by mass, and still more preferably 40 to 75% by mass, based on the mass of the slurry for an electrode film (assuming that the total mass of the slurry for an electrode film is 100% by mass).

The slurry for an electrode film can be prepared by various conventional known methods. Examples of the method include a preparing method by adding the electrode active material to the conductive material dispersion, and a preparing method by adding the binder resin to the conductive material dispersion and then adding the electrode active material. Furthermore, examples of the method include a preparing method by adding the electrode active material to the conductive material dispersion and then adding the binder resin, and a preparing method by adding the electrode active material to the binder resin-containing conductive material dispersion.

As a method for preparing the slurry for an electrode film, a method of adding the binder resin to the conductive material dispersion, and then performing a process of further adding and dispersing the electrode active material, is preferable. The dispersing device used for dispersion is not particularly limited. The slurry for an electrode film can be obtained by using the dispersion means described in the description of the conductive material dispersion.

The copolymer A also functions as a binder. Therefore, in one embodiment, the slurry for an electrode film can be obtained without adding the binder resin. Therefore, as a method for preparing the slurry for an electrode film, a method of performing a process of adding and dispersing the electrode active material without adding the binder resin to the conductive material dispersion, is also preferable.

<Electrode Film>

The electrode film according to one embodiment of the present invention includes a film formed by using the conductive material dispersion according to the above-described embodiment or a conductive composition using the same. In other words, the electrode film contains at least one selected from a group consisting of a film formed using the above-described conductive material dispersion, a film formed using the above-described binder resin-containing conductive material dispersion, and a film formed using the above-described slurry for an electrode film.

In one embodiment, the electrode film may further include a current collector. For example, the electrode film can be obtained by coating the slurry for an electrode film on the current collector and drying the slurry, and includes the current collector and the film. In the present specification, there is a case where "the film formed by using the slurry for an electrode film" is referred to as "electrode mixture layer".

The material and shape of the current collector used to form the electrode film are not particularly limited, and those suitable for various types of secondary batteries can be selected as appropriate. Examples of the materials of the current collector include metals such as aluminum, copper, nickel, titanium, or stainless steel, and or alloys thereof. As for the shape of the current collector, a foil in a shape of a flat plate is generally used. However, the current collector is not limited thereto, and a current collector with a roughened surface, a perforated foil-shaped current collector, or a mesh-shaped current collector can also be used.

The method for coating the current collector with the conductive material dispersion, the binder resin-containing conductive material dispersion, or the slurry for an electrode film is not particularly limited, and a known method can be used. Specific examples of the method that can be used can include a die coating method, a dip coating method, a roll coating method, a doctor blade coating method, a knife coating method, a spray coating method, a gravure coating method, a screen printing method, or an electrostatic coating method. As the drying method, for example, a leaving and drying method or a method using a blower dryer, a warm air dryer, an infrared heater, or a far infrared heater can be used. However, the drying method is not particularly limited thereto.

After the above-described coating, rolling treatment using a flat press, calendar rolls, and the like may be performed. The thickness of the formed film is, for example, 1 μm or greater and 500 μm or less, and preferably 10 μm or greater and 300 μm or less.

In one embodiment, a film formed by using the conductive material dispersion or the binder resin-containing conductive material dispersion can also be used as a base layer for an electrode mixture layer. By providing such a base layer, it is possible to improve the adhesion between the electrode mixture layer and the current collector, or to improve the conductivity of the electrode film.

<Non-Aqueous Electrolyte Secondary Battery>

A non-aqueous electrolyte secondary battery according to one embodiment of the present invention includes a cathode, an anode, and an electrolyte, and one selected from at least the group consisting of the cathode and the anode includes the electrode film according to the above-described embodiment.

For example, as a cathode, an electrode film prepared by coating the current collector with the slurry for an electrode film containing the cathode active material and drying the slurry, can be used.

As an anode, an electrode film prepared by coating the current collector with the slurry for an electrode film containing the anode active material and drying the slurry, can be used.

As electrolytes, a variety of conventionally known materials that can move ions can be used. Although not particularly limited, examples of the electrolytes may include lithium salts such as $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, $LiAlCl$, $LiHF_2$, LiSCN, or $LiBPh_4$ (where Ph is a phenyl group). It is preferable to dissolve the electrolyte in a non-aqueous solvent and use the dissolved electrolyte as an electrolytic solution.

Although not particularly limited, examples of the non-aqueous solvents include carbonates such as ethylene carbonate, propylene carbonate, butylene carbonate, dimethyl carbonate, ethyl methyl carbonate, and diethyl carbonate; lactones such as γ-butyrolactone, γ-valerolactone, and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane, and 1,2-dibutoxyethane; esters such as methyl formate, methyl acetate, and methyl propionate; sulfoxides such as dimethyl sulfoxide and sulfolane; and nitriles such as acetonitrile. Each of these solvents may be used alone, or a mixture of two or more types of thereof may be used.

In one embodiment, the non-aqueous electrolyte secondary battery preferably contains a separator. The separators are not particularly limited, but examples thereof include polyethylene nonwoven fabrics, polypropylene nonwoven fabrics, polyamide nonwoven fabrics, and nonwoven fabrics obtained by performing hydrophilic treatment on these nonwoven fabrics.

The structure of the non-aqueous electrolyte secondary battery according to one embodiment of the present invention is not particularly limited. In one embodiment, the non-aqueous electrolyte secondary battery may generally have a cathode, an anode, and a separator provided as needed. The non-aqueous electrolyte secondary battery can be configured in various shapes, such as a paper shape, a cylindrical shape, a button shape, and a stacked shape, depending on the purpose of use.

EXAMPLES

The present invention is described in more detail in the following examples. The present invention is not limited to the following examples as long as the gist of the present invention is not exceeded. In addition, unless otherwise specified, "part" indicates "part by mass" and "%" indicates "% by mass".

Further, in the examples, there is a case where "copolymer A" is referred to as "copolymer" or "dispersant". Furthermore, there is a case where "dispersant-containing liquid" containing a "dispersant" and a solvent is referred to as "dispersant solution". In addition, in the examples, iron, nickel, and chromium are used as a measuring target of the metal content in the conductive material dispersion, but the metal in the conductive material dispersion is not limited to iron.

<Measurement of Weight Average Molecular Weight (Mw) of Copolymer>

The weight average molecular weight (Mw) of the copolymer was measured by gel permeation chromatography (GPC) equipped with an RI detector. HLC-8320GPC (manufactured by Tosoh Corporation) was used as a device, and three separation columns were connected in series. "TSK-GEL SUPER AW-4000", "AW-3000", and "AW-2500" manufactured by Tosoh Corporation were used as fillers for the above-described separation columns, in this order. The measurement was performed at a flow rate of 0.6 mL/min by using N,N-dimethylformamide solution of 30 mM triethylamine and 10 mM LiBr as eluents at an oven temperature of 40° C. As a measurement sample, the concentration of the copolymer solution was adjusted to a concentration of 1% by using a solvent consisting of the above-described eluent, and 20 microliters of the adjusted solution was injected into the device. The weight average molecular weight is the polystyrene equivalent.

<Measurement of Hydrogen Addition Rate of Copolymer>

The hydrogen addition rate was determined from the measured value obtained by performing IR measurement using the infrared spectrophotometric analysis method by a total reflection measurement method. Specifically, the double bond derived from the conjugated diene monomer unit shows a peak at 970 cm$^{-1}$, while the hydrogen-added single bond shows a peak at 723 cm$^{-1}$. Therefore, the hydrogen addition rate was calculated from the ratio of the heights of these two peaks.

<Measurement of Mooney Viscosity (ML$_{1+4}$, 100° C.) of Copolymer>

The "Mooney viscosity (ML$_{1+4}$, 100° C.)" in the present invention can be measured at a temperature of 100° C. in accordance with JIS K6300-1.

<Measurement of Initial Viscosity of Conductive Material Dispersion>

To measure the viscosity value, first, using a B-type viscometer ("BL" manufactured by Toki Sangyo Co., Ltd.), the conductive material dispersion was sufficiently stirred with a spatula at a temperature of 25° C. After this, the viscosity value of the conductive material dispersion was immediately measured at a rotation speed of 60 rpm of the B-type viscometer rotor.

In the measurement, in a case where the viscosity value was less than 100 mPa·s, the No. 1 rotor was used. In a case where the viscosity value was 100 mPa·s or greater and less than 500 mPa·s, the No. 2 rotor was used. In a case where the viscosity value was 500 mPa·s or greater and less than 2,000 mPa·s, the No. 3 rotor was used. Furthermore, in a case where the viscosity value was 2,000 mPa·s or greater and less than 10,000 mPa·s, the No. 4 rotor was used. As the viscosity decreases, the dispersibility becomes better, and as the viscosity increases, the dispersibility becomes worse. When the obtained conductive material dispersion was clearly separated or settled, it was determined that the dispersibility was poor.

(Determination Criteria for Initial Viscosity)
◉: Less than 500 mPa·s (excellent)
○: 500 mPa·s or greater and less than 2,000 mPa·s (good)
Δ: 2,000 mPa·s or greater and less than 10,000 mPa·s (acceptable)
X: 10,000 mPa·s or greater, sedimentation or separation (poor)

<Measurement of Complex Elastic Modulus and Phase Angle of Conductive Material Dispersion>

The complex elastic modulus and the phase angle of the conductive material dispersion were measured using a rheometer (RheoStress 1 rotational rheometer manufactured by Thermo Fisher Scientific) with a 60 mm diameter and 2° cone. The dynamic viscoelastic modulus was measured in the range of 0.01% to 5% strain rate at 25° C. and frequency of 1 Hz, and evaluated according to the following criteria. As the obtained complex elastic modulus decreases, the dispersibility becomes better, and as the modulus increases, the dispersibility becomes worse. In addition, as the obtained value of the phase angle increases, the dispersibility becomes better, and as the modulus decreases, the dispersibility becomes worse.

(Determination Criteria for Complex Elastic Modulus)
◉: Less than 5 Pa (excellent)
○: 5 Pa or greater and less than 20 Pa (acceptable)
X: 20 Pa or greater (poor)
XX: 100 Pa or greater (extremely poor)

(Determination Criteria for Phase Angle)
◉: 45° or greater (excellent)
○: 30° or greater and less than 45° (good)
Δ: 19° or greater and less than 30° (acceptable)
X: Less than 19° (poor)

<Stability Evaluation of Conductive Material Dispersion>

Storage stability was evaluated based on the change in liquid properties after storing the conductive material dispersion at 50° C. for 7 days. The change in liquid properties was determined from the ease of stirring when stirred with a spatula. (Determination Criteria)
○: No problem (good)
Δ: Viscosity increases, but gelation does not occur (acceptable)
X: Gelation is occurring (extremely poor)

<Measurement of Metal Content in Conductive Material Dispersion>

The metal content in the conductive material dispersion can be analyzed using high-frequency inductively coupled plasma (ICP). The conductive material dispersion was pretreated by the acid decomposition method in accordance with Japanese Industrial Standard JIS K0116; 2014, and the content of iron, nickel, and chromium ions and atoms was measured by ICP emission spectrometry method.

<Conductivity Evaluation of Cathode Mixture Layer>

The cathode film for conductivity evaluation was obtained by coating a PET film (100 μm thick) with the cathode mixture slurry by using an applicator having a gap of 175 μm, and by drying the coated PET film in a hot air oven at 70° C. for 10 min and in a hot air oven at 120° C. for 15 min. The surface resistivity (Ω/□) of the cathode mixture layer was measured by using Lorestar GP, MCP-T610 manufactured by Mitsubishi Chemical Analytech, Co., Ltd. After the measurement, the volume resistivity (Ω·cm) was determined by multiplying the thickness of the cathode mixture layer formed on the PET film. The thickness of the cathode mixture layer was determined as the difference between the average value of the cathode film and the film thickness of the PET film by measuring three points in the cathode film to obtain the average value of the cathode film, by using a film thickness meter (DIGIMICRO MH-15M manufactured by NIKON Corporation).

(Determination Criteria)
◉: Volume resistivity (Ω·cm) of the cathode mixture layer is less than 10 (excellent).
○: Volume resistivity (Ω·cm) of the cathode mixture layer is 10 or greater and less than 20 (good).
X: Volume resistivity (Ω·cm) of the cathode composite layer is 20 or greater (poor)

<Rate Characteristics Evaluation of Non-aqueous Electrolyte Secondary Battery>

The non-aqueous electrolyte secondary battery was installed in a thermostatic chamber at 25° C., and charging and discharging measurement was performed by using a charging and discharging device (SM-8 manufactured by Hokuto Denko Corporation). After performing constant-current constant-voltage charging (cutoff current 1 mA (0.02 C)) at an end-of-charge voltage of 4.3 V with a charge current of 10 mA (0.2 C), constant-current discharging was performed at an end-of-discharge voltage of 3V with a discharge current of 10 mA (0.2 C). After repeating this operation three times, constant-current constant-voltage charging (cutoff current (1 mA (0.02 C)) was performed at an end-of-charge voltage of 4.3 V with a charge current of 10 mA (0.2 C), constant-current discharging was performed at discharge currents of 0.2 C and 3 C until the end-of-discharge voltage reached 3.0 V, and the discharge capacities were determined, respectively. The rate characteristics can be expressed as a ratio of 0.2 C discharge capacity to 3 C discharge capacity (Equation 1 below).

$$\text{Rate characteristics}=3C \text{ discharge capacity}/0.2C \text{ discharge capacity at third time} \times 100(\%) \quad \text{(Equation 1)}$$

(Determination Criteria)

◎: Rate characteristics are 80% or greater (excellent)

○: Rate characteristics are 60% or greater and less than 80% (good)

X: Rate characteristics are 30% or greater and less than 60% (poor)

XX: Rate characteristics are less than 30% (extremely poor)

<Cycle Characteristic Evaluation Method of Non-Aqueous Electrolyte Secondary Battery>

The non-aqueous electrolyte secondary battery was installed in a thermostatic chamber at 25° C., and charging and discharging measurement was performed by using a charging and discharging device (SM-8 manufactured by Hokuto Denko Corporation). After performing constant-current constant-voltage charging (cutoff current 2.5 mA (0.05 C)) at an end-of-charge voltage of 4.3 V with a charge current of 25 mA (0.5 C), constant-current discharging was performed at an end-of-discharge voltage of 3V with a discharge current of 25 mA (0.5 C). This operation was repeated 200 times. The cycle characteristics can be expressed as a ratio of the 0.5 C discharge capacity at the third time at 25° C. to the 0.5 C discharge capacity at the 200th time (Equation 2 below).

$$\text{Cycle characteristics}=0.5C \text{ discharge capacity at third time}/0.5C \text{ discharge capacity at the 200th time} \times 100(\%) \quad \text{(Equation 2)}$$

(Determination Criteria)

◎: Cycle characteristics are 85% or greater (excellent)

○: Cycle characteristics are 80% or greater and less than 85% (good)

X: Cycle characteristics are 60% or greater and less than 80% (poor)

XX: Cycle characteristics are less than 60% (extremely poor)

<1> Preparation of Dispersant (Synthesis Example of Copolymer)

Synthesis Example 1: Preparation of Copolymer 1

To a stainless steel polymerization reactor, 35 parts acrylonitrile, 65 parts 1,3-butadiene, 3 parts potassium oleate soap, 0.3 parts azobisisobutyronitrile, 0.55 parts t-dodecyl mercaptan, and 200 parts ion-exchanged water were added. Under a nitrogen atmosphere, the polymerization was performed for 20 hours at 45° C. with stirring, and the polymerization was completed at a conversion rate of 90%. Unreacted monomers were removed by reduced pressure stripping to obtain acrylonitrile-conjugated diene rubber latex with a solid content concentration of approximately 30%.

Then, ion-exchanged water was added to the latex to adjust the total solid content concentration to 12%, and the latex was put into an autoclave with a stirrer with a volume of 1 L, and nitrogen gas was flowed for 10 minutes to remove the dissolved oxygen in the contents. The catalyst solution was prepared by dissolving 75 mg of palladium acetate as a hydrogenation catalyst in 180 mL of ion-exchanged water in which 4 times the molar amount of nitric acid was added to palladium.

The catalyst solution was added to the autoclave, and the inside of the autoclave was replaced with hydrogen gas 2 times. After this, the contents of the autoclave were heated to 50° C. in a state of being pressurized with hydrogen gas up to 3 MPa, and the hydrogenation reaction was performed contents for 6 hours. The contents were then returned to room temperature, the autoclave was made to have a nitrogen atmosphere, and then, the solid content was dried and a copolymer 1 was collected.

The hydrogen addition rate of the copolymer 1 was 99.6%, and the weight average molecular weight (Mw) was 150,000. In the acrylonitrile-conjugated diene rubber, the content of the conjugated diene monomer units was 65% and the content of the nitrile group-containing monomer units was 35%, based on the mass of acrylonitrile-conjugated diene rubber. In addition, in the copolymer 1, the content of the aliphatic hydrocarbon structural units containing the alkylene structural unit was 65%, and the content of the nitrile group-containing monomer units was 35%, based on the mass of the copolymer 1. These contents of the monomer units and structural units were determined from the amount of monomers used (the same applies to the following synthetic examples). In addition, the Mooney viscosity ($ML_{1+4}$, 100° C.) of the copolymer 1 was measured to be 49.

Synthesis Examples 2 to 8: Preparation of Copolymers 2 to 8

The copolymers 2 to 8 were prepared in the same manner as that in Synthetic Example 1, except that the monomer composition used was changed according to Table 1, and the content of t-dodecyl mercaptan, which is a molecular weight modifier, was changed appropriately to achieve the target Mooney viscosity of the copolymers. The Mooney viscosities of the obtained copolymers 2 to 8 are shown in Table 1.

In addition, the abbreviations listed in the columns for monomers in Table 1 refer to the following.

BD: 1,3-butadiene
MBD: 2-methyl-1,3-butadiene
AN: Acrylonitrile
MAN: Methacrylonitrile
AAm: Acrylamide
BA: Butylacrylate

TABLE 1

|  | Monomer | | | | | | Mooney viscosity ($ML_{1+4}$, 100° C.) |
|---|---|---|---|---|---|---|---|
| Copolymer | BD | MBD | AN | MAN | AAm | BA | |
| Copolymer 1 | 65 | | 35 | | | | 49 |
| Copolymer 2 | 60 | | 35 | | | 5 | 53 |
| Copolymer 3 | 80 | | 20 | | | | 60 |
| Copolymer 4 | 45 | 25 | 15 | 15 | | | 55 |
| Copolymer 5 | 65 | | 25 | 10 | | | 50 |
| Copolymer 6 | 65 | | 33 | | 2 | | 58 |
| Copolymer 7 | 61 | | 35 | | 2 | 2 | 65 |
| Copolymer 8 | 55 | | 20 | 15 | | 10 | 90 |

<2> Preparation of Conductive Material Dispersion (Example 1-1)

According to the composition shown in Table 2, the previously prepared copolymer 1, NMP, and NaOH were added to a stainless steel container and stirred with a dispenser until the solution became uniform. After this, the conductive material was added while stirring with a disperser, a square hole high shear screen was attached to a high shear mixer (L5M-A manufactured by SILVERSON), the entire mixture became uniform at a speed of 8,500 rpm, and batch dispersion was performed with a grind gauge until the dispersion particle size became 250 μm or less. Then, the dispersed liquid was supplied from the stainless steel container to a high-pressure homogenizer (Star Burst Labo HJP-17007 manufactured by Sugino Machine Limited) via piping, and the pass-type dispersion treatment was performed 25 times.

The above-described dispersion treatment was performed using a single nozzle chamber having a nozzle diameter of 0.25 mm and a pressure of 100 MPa. Furthermore, the conductive material dispersion (dispersion 1) was obtained by making the solution pass through a nylon mesh having a mesh opening of 48 μm 3 times and then filtering the solution through a magnetic filter (manufactured by Tok Engineering Co., Ltd.) at room temperature and a magnetic flux density of 12,000 gauss.

On the magnetic filter after filtration, adhesion of magnetic granular metal pieces was observed. In addition, as shown in Table 2, the dispersion 1 had low viscosity and good stability, and the metal content was 2 ppm as measured by the ICP analysis method. In addition, the pH of the dispersion 1 was measured by the above-described method, and the result thereof was 9.6.

Examples 1-2 to 1-22 and Comparative Examples 1-1 to 1-5 and 1-7 to 1-10

In accordance with the composition shown in Table 2, each dispersion (dispersions 2 to 22 and comparative dispersions 1 to 5 and 7 to 10) was obtained in the same manner as that in Example 1-1.

As shown in Table 3, the conductive material dispersions (dispersions 2 to 22) of the present invention all had low viscosity and good stability. The pH measurement results of the dispersions 2 to 22 and the comparative dispersions 1 to 5 and 7 to 10 are shown in Table 2.

Comparative Examples 1 to 6

According to the composition shown in Table 2, the copolymer 1, NMP, and NaOH were added to a stainless steel container and stirred with a dispenser until the solution became uniform. After this, the conductive material was added while stirring with a disperser, a square hole high shear screen was attached to a high shear mixer (L5M-A manufactured by SILVERSON), the entire mixture became uniform at a speed of 8,500 rpm, and batch dispersion was performed with a grind gauge until the dispersion particle size became 250 μm or less. Then, the dispersed liquid was supplied from the stainless steel container to a high-pressure homogenizer (Star Burst Labo HJP-17007 manufactured by Sugino Machine Limited) via piping, and the pass-type dispersion treatment was performed 10 times.

The above-described dispersion treatment was performed using a single nozzle chamber having a nozzle diameter of 0.25 mm and a pressure of 100 MPa. Furthermore, the comparative dispersion 6 was obtained by making the solution pass through a nylon mesh having a mesh opening of 48 μm 3 times and then filtering the solution through a magnetic filter (manufactured by Tok Engineering Co., Ltd.) at room temperature and a magnetic flux density of 12,000 gauss.

The initial viscosity of the obtained comparative dispersion 6 was 5,500 mPa·s, and the phase angle was measured to be 14°.

The abbreviations in Table 2 refer to the following.
100T: K-Nanos 100T (manufactured by Kumho Petrochemical Co., Ltd., multilayer CNT, outer diameter 10 to 15 nm)
Flotube 9110: Cnano FT9110CNT (manufactured by Cnano Technology Ltd., multilayer CNT, average outer diameter 11 nm)
BT1003M: LUCAN BT1003M (manufactured by LG Chem Ltd., multilayer CNT, average outer diameter 13 nm)
8S: JENOTUBE8S (manufactured by JEIO Co., Ltd., multilayer CNT, outer diameter 6 to 9 nm)
HS-100: Denka Black HS-100 (manufactured by Denka Company Limited, acetylene black, average primary particle diameter 48 nm, specific surface area 39 m$^2$/g)
PVP: Polyvinylpyrrolidone K-30 (manufactured by Nippon Shokubai Co., Ltd., solid content 100%)
H-NBR1: Therban (R) 3406 (manufactured by ARLANXEO, Mooney viscosity (ML$_{1+4}$, 100° C.) 63, acrylonitrile content 34.0%)
H-NBR2: Zetpole (R) 2000L (manufactured by Zeon Corporation, Mooney viscosity (ML$_{1+4}$, 100° C.) 65, less than 36.2% of acrylonitrile content)

TABLE 2

| Example Comparative Example | Conductive material dispersion | Conductive material Type | Conductive material Added amount (part) | Dispersant Type | Dispersant Added amount (part) | Base or other additives Type | Base or other additives Added amount (part) | Solvent Type | Solvent Added amount (part) | pH |
|---|---|---|---|---|---|---|---|---|---|---|
| Example 1-1 | Dispersion 1 | 100T | 5 | Copolymer 1 | 1 | NaOH | 0.04 | NMP | 93.96 | 9.6 |
| Example 1-2 | Dispersion 2 | 100T | 5 | Copolymer 2 | 1 | NaOH | 0.04 | NMP | 93.96 | 9.3 |
| Example 1-3 | Dispersion 3 | 100T | 5 | Copolymer 3 | 1 | NaOH | 0.04 | NMP | 93.96 | 9.6 |
| Example 1-4 | Dispersion 4 | 100T | 5 | Copolymer 4 | 1 | NaOH | 0.04 | NMP | 93.96 | 9.6 |
| Example 1-5 | Dispersion 5 | 100T | 5 | Copolymer 5 | 1 | NaOH | 0.04 | NMP | 93.96 | 9.7 |
| Example 1-6 | Dispersion 6 | 100T | 5 | Copolymer 6 | 1 | NaOH | 0.04 | NMP | 93.96 | 9.9 |
| Example 1-7 | Dispersion 7 | 100T | 5 | Copolymer 7 | 1 | NaOH | 0.04 | NMP | 93.96 | 9.6 |
| Example 1-8 | Dispersion 8 | 100T | 5 | Copolymer 8 | 0.9 | NaOH | 0.045 | NMP | 94.06 | 10.2 |
| Example 1-9 | Dispersion 9 | 100T | 5 | H-NBR1 | 1 | NaOH | 0.04 | NMP | 93.96 | 9.6 |
| Example 1-10 | Dispersion 10 | 100T | 5 | H-NBR2 | 1 | KOH | 0.04 | NMP | 93.96 | 9.3 |
| Example 1-11 | Dispersion 11 | 100T | 5 | Copolymer 1 | 1 | KOH | 0.04 | NMP | 93.96 | 9.6 |
| Example 1-12 | Dispersion 12 | 100T | 5 | Copolymer 1 | 1 | LiOH | 0.04 | NMP | 93.96 | 9.6 |
| Example 1-13 | Dispersion 13 | 100T | 5 | Copolymer 4 | 1 | Mg(OH)$_2$ | 0.04 | NMP | 93.96 | 9.9 |
| Example 1-14 | Dispersion 14 | Flotube 9110 | 5 | Copolymer 1 | 1 | NaOH | 0.06 | NMP | 93.94 | 10.0 |
| Example 1-15 | Dispersion 15 | BT1003M | 5 | Copolymer 2 | 1 | KOH | 0.06 | NMP | 93.94 | 10.0 |

TABLE 2-continued

| Example Comparative Example | Conductive material dispersion | Conductive material Type | Added amount (part) | Dispersant Type | Added amount (part) | Base or other additives Type | Added amount (part) | Solvent Type | Added amount (part) | pH |
|---|---|---|---|---|---|---|---|---|---|---|
| Example 1-16 | Dispersion 16 | 8S | 2.5 | Copolymer 1 | 0.625 | NaOH | 0.031 | NMP | 96.84 | 9.5 |
| Example 1-17 | Dispersion 17 | 8S/HS-100 | 2/4 | Copolymer 1 | 1.2 | KOH | 0.072 | NMP | 92.73 | 10.8 |
| Example 1-18 | Dispersion 18 | 8S/HS-100 | 2/7 | Copolymer 2 | 1.4 | NaOH | 0.098 | NMP | 87.50 | 11.1 |
| Comparative Example 1-1 | Comparative Dispersion 1 | 100T | 5 | Copolymer 8 | 1 | — | | NMP | 94.00 | 8.0 |
| Comparative Example 1-2 | Comparative Dispersion 2 | 100T | 5 | Copolymer 3 | 1 | Aminoethanol | 0.04 | NMP | 93.96 | 8.5 |
| Comparative Example 1-3 | Comparative Dispersion 3 | 100T | 5 | H-NBR2 | 1 | Diisopropylamine | 0.04 | NMP | 93.96 | 8.3 |
| Comparative Example 1-4 | Comparative Dispersion 4 | 100T | 5 | PVP | 1 | NaOH | 0.04 | NMP | 93.96 | 9.5 |
| Comparative Example 1-5 | Comparative Dispersion 5 | 100T | 5 | Copolymer 3 | 1 | Aminoethanol | 0.5 | NMP | 93.50 | 11.1 |
| Comparative Example 1-6 | Comparative Dispersion 6 | 100T | 5 | Copolymer 1 | 1 | NaOH | 0.04 | NMP | 93.96 | 9.7 |
| Example 1-19 | Dispersion 19 | 8S | 2.5 | H-NBR2 | 0.625 | NaOH | 0.038 | NMP | 96.84 | 9.5 |
| Example 1-20 | Dispersion 20 | 8S | 2 | H-NBR2 | 0.5 | NaOH | 0.030 | NMP | 97.47 | 9.3 |
| Example 1-21 | Dispersion 21 | 8S | 1.5 | H-NBR2 | 0.375 | NaOH | 0.023 | NMP | 98.10 | 9.3 |
| Example 1-22 | Dispersion 22 | 8S | 1 | H-NBR2 | 0.25 | NaOH | 0.015 | NMP | 98.74 | 9.1 |
| Comparative Example 1-7 | Comparative Dispersion 7 | 8S | 2.5 | H-NBR2 | 0.625 | — | | NMP | 96.88 | 8.0 |
| Comparative Example 1-8 | Comparative Dispersion 8 | 8S | 2 | H-NBR2 | 0.5 | — | | NMP | 97.50 | 8.0 |
| Comparative Example 1-9 | Comparative Dispersion 9 | 8S | 1.5 | H-NBR2 | 0.375 | — | | NMP | 98.13 | 8.0 |
| Comparative Example 1-10 | Comparative Dispersion 10 | 8S | 1 | H-NBR2 | 0.25 | — | | NMP | 98.75 | 8.1 |

TABLE 3

| Example Comparative Example | Complex elastic modulus | Phase angle | Initial viscosity | Stability | Metal content (ppm) |
|---|---|---|---|---|---|
| Example 1-1 | ⊚ | ⊚ | ⊚ | ○ | 2 |
| Example 1-2 | ⊚ | ⊚ | ⊚ | ○ | 5 |
| Example 1-3 | ⊚ | ⊚ | ○ | ○ | 10 |
| Example 1-4 | ⊚ | ⊚ | ⊚ | ○ | 3 |
| Example 1-5 | ○ | ○ | ⊚ | ○ | 3 |
| Example 1-6 | ⊚ | ⊚ | ⊚ | ○ | 3 |
| Example 1-7 | ⊚ | ⊚ | ○ | ○ | 3 |
| Example 1-8 | ○ | ○ | ○ | ○ | 10 |
| Example 1-9 | ⊚ | ⊚ | ⊚ | ○ | 2 |
| Example 1-10 | ⊚ | ⊚ | ⊚ | ○ | 2 |
| Example 1-11 | ⊚ | ⊚ | ⊚ | ○ | 2 |
| Example 1-12 | ⊚ | ⊚ | ⊚ | ○ | 3 |
| Example 1-13 | ⊚ | ⊚ | ⊚ | ○ | 2 |
| Example 1-14 | ⊚ | ⊚ | ⊚ | ○ | 4 |
| Example 1-15 | ⊚ | ⊚ | ⊚ | ○ | 2 |
| Example 1-16 | ○ | ⊚ | ○ | ○ | 10 |
| Example 1-17 | ⊚ | ⊚ | ⊚ | ○ | 9 |
| Example 1-18 | ⊚ | ⊚ | ⊚ | Δ | 3 |
| Comparative Example 1-1 | XX | X | X | X | >200 |
| Comparative Example 1-2 | X | X | X | X | 150 |
| Comparative Example 1-3 | X | X | X | X | 120 |
| Comparative Example 1-4 | X | X | Δ | X | 80 |
| Comparative Example 1-5 | X | X | Δ | X | 150 |
| Comparative Example 1-6 | X | X | Δ | Δ | 60 |
| Example 1-19 | ○ | ⊚ | ○ | ○ | 8 |
| Example 1-20 | ○ | ⊚ | ○ | ○ | 5 |
| Example 1-21 | ⊚ | ⊚ | ⊚ | ○ | 3 |
| Example 1-22 | ⊚ | ⊚ | ⊚ | ○ | 3 |
| Comparative Example 1-7 | XX | X | X | X | >200 |
| Comparative Example 1-8 | XX | X | X | X | >200 |
| Comparative Example 1-9 | X | X | Δ | X | 180 |
| Comparative Example 1-10 | X | Δ | Δ | X | 150 |

As shown in Table 3, the conductive material dispersions (dispersions 1 to 18) of the examples all had low viscosity and good storage stability. In addition, the metal contents of the dispersions 1 to 18 were all 10 ppm or less.

Meanwhile, the comparative dispersions 1 to 6 had high viscosity and poor storage stability. In particular, the comparative dispersion 1 had extremely poor storage stability. In addition, all of the comparative dispersions resulted in degradation of the metallic foreign matter removal process efficiency compared to the conductive material dispersions in the examples. In addition, similarly, the complex elastic modulus and the phase angle of the dispersions 1 to 18 were all good, while the complex elastic modulus and the phase angle of the comparative dispersions 1 to 6 were poor. In particular, the complex elastic modulus of the comparative dispersion 1 was approximately 300 Pa, which was extremely poor.

When the pH of the dispersant (copolymer A) is less than 9.0, as in Comparative Example 1-1, the viscosity of the dispersant solution is high, and the viscosity of the obtained conductive material dispersion is also extremely high. As shown in Comparative Examples 1-2 and 1-3, even with the addition of base, the viscosity of the conductive material dispersion was poor when the pH was less than 9.0. The dispersant (copolymer A) in the example has a pH of 9.0 or greater for the conductive material dispersion. As a result, it is considered that not only the viscosity of the dispersant solution is lowered, but also the adsorption force to the conductive material is improved, and a conductive material dispersion having good dispersibility can be easily obtained. Further, as in Comparative Examples 1-5 and 1-6, even when the pH is 9.0 or greater, in a case where the phase angle at a frequency of 1 Hz is less than 19°, the initial viscosity and stability became poor, and the result was that the metal content was also large.

In all of the dispersions 19 to 22 and the comparative dispersions 7 to 10 which are obtained in Examples 1-19 to 1-22 and Comparative Examples 1-7 to 1-10, the same conductive material (CNT (8S)) is used. The CNT concentrations in the dispersions are 2.5, 2.0, 1.5, and 1.0 (% by mass), respectively. The relationship is shown in the graph of FIGURE with the CNT concentration (% by mass) in the dispersion on the x axis and the complex elastic modulus [G*] (Pa) obtained by dynamic viscoelasticity measurement on the y axis.

As shown in FIGURE, when compared to the dispersions having the same CNT concentration, the dispersions obtained from Examples 1-19 to 1-22 have a smaller complex elastic modulus y obtained by dynamic viscoelasticity measurement than those of the comparative dispersions, the difference therebetween is remarkable, and it can be confirmed that y<8x is satisfied.

In a case where CNT having a strong cohesive force is dispersed, as in Examples 1-19 to 1-22 and Comparative Examples 1-7 to 1-10, the value of complex elastic modulus decreases as the CNT concentration decreases as shown in FIGURE. However, as shown in Table 3, the storage stability of the comparative dispersions was poor. It is considered that this is because the dispersant containing no copolymer A has a low adsorption force to the conductive material and cannot maintain a stable dispersed state regardless of the concentration of the conductive material.

In other words, the conductive material dispersion containing carbon fibers shown in the examples satisfies the relationships in the following expression (1), expression (2), and expression (3) below.

$$y<8x \quad (1)$$

$$y<20 \quad (2)$$

$$0.1 \leq x \leq 10 \quad (3)$$

<3> Preparation of Cathode Mixture Slurry and Cathode Film

Example 2-1

According to the composition shown in Table 4, the conductive material dispersion (dispersion 1) and NMP in which 8% by mass PVDF was dissolved were added to a plastic container having a capacity of 150 mL. Then, the binder resin-containing conductive material dispersion was obtained by stirring at 2,000 rpm for 30 seconds using a self-rotating and revolving mixer (Awatori Rentaro ARE-310 manufactured by Thinky Corporation).

Then, NMC was added to the above-described binder resin-containing conductive material dispersion as an electrode active material and stirred at 2,000 rpm for 20 minutes using a self-rotating and revolving mixer. Furthermore, after this, NMP was added and stirred at 2,000 rpm for 30 seconds using a self-rotating and revolving mixer to obtain a cathode mixture slurry. The solid content of the cathode mixture slurry was 75% by mass.

The cathode mixture slurry was coated onto a 20 μm thick aluminum foil, which serves as the current collector, using an applicator. Then, the coating was dried in an electric oven at 120° C.±5° C. for 25 minutes to adjust the amount of coating per unit area of the electrode to be 20 mg/cm². Furthermore, rolling treatment was performed by using a roll press (3t hydraulic roll press manufactured by THANK METAL Co., Ltd.) to prepare a cathode film 1a having a density of cathode mixture layer of 3.1 g/cm3.

(Examples 2-2 to 2-18 and Comparative Examples 2-1 to 2-6) Cathode films 2a to 18a and comparative cathode films 1a to 6a were prepared by the same method as that in Example 2-1, except that the type of conductive material dispersion was changed.

Examples 3-1 and 3-2 and Comparative Examples 3-1 to 3-5

As shown in Table 4, cathode films 1b and 2b and comparative cathode films 1b to 5b were prepared by the same method as that in Examples 2-1 to 2-18 and Comparative Examples 2-1 to 2-6, except that the electrode active material was changed to NCA.

In addition, the abbreviations in Table 4 refer to the following.

NMC: NCM523 (manufactured by Nippon Chemical Industrial Co., Ltd., composition: $LiNi_{0.5}Co_{0.2}Mn_{0.3}O_2$, solid content 100%)

NCA: HED (registered trademark) NAT-7050 (manufactured by BASF TODA Battery Materials LLC, composition: $LiNi_{0.8}Co_{0.15}Al_{0.05}O_2$), solid content 100%

PVDF: polyvinylidene fluoride (Solef #5130 (manufactured by Solvey Co., Ltd.), solid content 100%)

TABLE 4

| Example Comparative Example | Conductive material dispersion | Cathode active material Type | Added amount (part) | Conductive material Type | Added amount (part) | Copolymer A Type | Added amount (part) | PVDF Added amount (part) | Base Type | Added amount (part) |
|---|---|---|---|---|---|---|---|---|---|---|
| Example 2-1 | Dispersion 1 | NMC | 98.1 | 100T | 0.30 | Copolymer 1 | 0.06 | 1.5 | NaOH | 0.0024 |
| Example 2-2 | Dispersion 2 | NMC | 98.1 | 100T | 0.30 | Copolymer 2 | 0.06 | 1.5 | NaOH | 0.0024 |
| Example 2-3 | Dispersion 3 | NMC | 98.1 | 100T | 0.30 | Copolymer 3 | 0.06 | 1.5 | NaOH | 0.0024 |
| Example 2-4 | Dispersion 4 | NMC | 98.1 | 100T | 0.30 | Copolymer 4 | 0.06 | 1.5 | NaOH | 0.0024 |
| Example 2-5 | Dispersion 5 | NMC | 98.1 | 100T | 0.30 | Copolymer 5 | 0.06 | 1.5 | NaOH | 0.0024 |
| Example 2-6 | Dispersion 6 | NMC | 98.1 | 100T | 0.30 | Copolymer 6 | 0.06 | 1.5 | NaOH | 0.0024 |
| Example 2-7 | Dispersion 7 | NMC | 98.1 | 100T | 0.30 | Copolymer 7 | 0.06 | 1.5 | NaOH | 0.0024 |
| Example 2-8 | Dispersion 8 | NMC | 98.1 | 100T | 0.30 | Copolymer 8 | 0.054 | 1.5 | NaOH | 0.0027 |
| Example 2-9 | Dispersion 9 | NMC | 98.1 | 100T | 0.30 | H-NBR1 | 0.06 | 1.5 | NaOH | 0.0024 |
| Example 2-10 | Dispersion 10 | NMC | 98.1 | 100T | 0.30 | H-NBR2 | 0.06 | 1.5 | KOH | 0.0024 |
| Example 2-11 | Dispersion 11 | NMC | 98.1 | 100T | 0.30 | Copolymer 1 | 0.06 | 1.5 | KOH | 0.0024 |
| Example 2-12 | Dispersion 12 | NMC | 98.1 | 100T | 0.30 | Copolymer 1 | 0.06 | 1.5 | LiOH | 0.0024 |
| Example 2-13 | Dispersion 13 | NMC | 98.1 | 100T | 0.30 | Copolymer 4 | 0.06 | 1.5 | $Mg(OH)_2$ | 0.0036 |
| Example 2-14 | Dispersion 14 | NMC | 98.1 | Flotube 9110 | 0.30 | Copolymer 1 | 0.06 | 1.5 | NaOH | 0.0036 |
| Example 2-15 | Dispersion 15 | NMC | 98.1 | BT1003M | 0.30 | Copolymer 2 | 0.06 | 1.5 | KOH | 0.0036 |
| Example 2-16 | Dispersion 16 | NMC | 98.1 | 8S | 0.30 | Copolymer 1 | 0.075 | 1.5 | NaOH | 0.00375 |
| Example 2-17 | Dispersion 17 | NMC | 98.0 | 8S/HS-100 | 0.40 | Copolymer 1 | 0.08 | 1.5 | KOH | 0.0048 |
| Example 2-18 | Dispersion 18 | NMC | 98.0 | 8S/HS-100 | 0.40 | Copolymer 2 | 0.08 | 1.5 | NaOH | 0.0056 |
| Comparative Example 2-1 | Comparative Dispersion 1 | NMC | 98.1 | 100T | 0.30 | Copolymer 8 | 0.06 | 1.5 | — | |
| Comparative Example 2-2 | Comparative Dispersion 2 | NMC | 98.1 | 100T | 0.30 | Copolymer 3 | 0.06 | 1.5 | Aminoethanol | 0.0024 |
| Comparative Example 2-3 | Comparative Dispersion 3 | NMC | 98.1 | 100T | 0.30 | H-NBR2 | 0.06 | 1.5 | Diisopropylamine | 0.0024 |
| Comparative Example 2-4 | Comparative Dispersion 4 | NMC | 98.1 | 100T | 0.30 | PVP | 0.06 | 1.5 | NaOH | 0.0024 |
| Comparative Example 2-5 | Comparative Dispersion 5 | NMC | 98.1 | 100T | 0.30 | Copolymer 3 | 0.06 | 1.5 | Aminoethanol | 0.03 |
| Comparative Example 2-6 | Comparative Dispersion 6 | NMC | 98.1 | 100T | 0.30 | Copolymer 1 | 0.06 | 1.5 | NaOH | 0.0024 |
| Example 3-1 | Dispersion 1 | NCA | 981 | 100T | 0.30 | Copolymer 1 | 0.06 | 1.5 | NaOH | 0.0024 |
| Example 3-2 | Dispersion 16 | NCA | 98.1 | 8S | 0.30 | Copolymer 1 | 0.06 | 1.5 | NaOH | 0.003 |
| Comparative Example 3-1 | Comparative Dispersion 1 | NCA | 98.1 | 100T | 0.30 | Copolymer 8 | 0.06 | 1.5 | — | |
| Comparative Example 3-2 | Comparative Dispersion 2 | NCA | 981 | 100T | 0.30 | Copolymer 3 | 0.06 | 1.5 | Aminoethanol | 0.0024 |
| Comparative Example 3-3 | Comparative Dispersion 4 | NCA | 98.1 | 100T | 0.30 | PVP | 0.06 | 1.5 | NaOH | 0.0024 |
| Comparative Example 3-4 | Comparative Dispersion 5 | NCA | 98.1 | 100T | 0.30 | Copolymer 3 | 0.06 | 1.5 | Aminoethanol | 0.03 |
| Comparative Example 3-5 | Comparative Dispersion 6 | NCA | 98.1 | 100T | 0.30 | Copolymer 1 | 0.06 | 1.5 | NaOH | 0.0024 |

Table 5 shows the evaluation results of the electrodes. All of the electrode films made by using the conductive material dispersions having low viscosity and good stability showed good resistance values. From this, it is considered that CNT can efficiently form the conductive network as compared with the comparative examples.

In addition, in the examples, the removal of metallic foreign matter during the production of the conductive material dispersion was efficiently performed. In contrast, it is considered that, in the conductive material dispersion in the comparative examples, the viscosity is high, the metallic foreign matter cannot be efficiently removed, the metallic foreign matter remains, and as a result, the resistance deteriorates.

In contrast to a case where the copolymer A is used without adjusting the pH of the dispersion, according to the examples of the present invention where the copolymer A is used after adjusting the pH of the dispersion, the adsorption force of the copolymer A to the conductive material and electrode active material particles is improved, and accordingly, the ability to disperse these is improved. Therefore, it is considered that good dispersibility of the conductive material and the electrode active material was maintained not only in the conductive material dispersion but also after the electrode film was formed, resulting in excellent resistance.

TABLE 5

| Example Comparative Example | Cathode | Resistance | Example Comparative Example | Battery | Rate characteristics | Cycle characteristics |
|---|---|---|---|---|---|---|
| Example 2-1 | Cathode 1a | ⊚ | Example 4-1 | Battery 1a | ⊚ | ⊚ |
| Example 2-2 | Cathode 2a | ⊚ | Example 4-2 | Battery 2a | ⊚ | ⊚ |
| Example 2-3 | Cathode 3a | ○ | Example 4-3 | Battery 3a | ⊚ | ⊚ |
| Example 2-4 | Cathode 4a | ⊚ | Example 4-4 | Battery 4a | ⊚ | ⊚ |

TABLE 5-continued

| Example Comparative Example | Cathode | Resistance | Example Comparative Example | Battery | Rate characteristics | Cycle characteristics |
|---|---|---|---|---|---|---|
| Example 2-5 | Cathode 5a | ○ | Example 4-5 | Battery 5a | ○ | ⊚ |
| Example 2-6 | Cathode 6a | ⊚ | Example 4-6 | Battery 6a | ⊚ | ⊚ |
| Example 2-7 | Cathode 7a | ○ | Example 4-7 | Battery 7a | ⊚ | ⊚ |
| Example 2-8 | Cathode 8a | ○ | Example 4-8 | Battery 8a | ○ | ⊚ |
| Example 2-9 | Cathode 9a | ⊚ | Example 4-9 | Battery 9a | ⊚ | ⊚ |
| Example 2-10 | Cathode 10a | ⊚ | Example 4-10 | Battery 10a | ⊚ | ⊚ |
| Example 2-11 | Cathode 11a | ⊚ | Example 4-11 | Battery 11a | ⊚ | ⊚ |
| Example 2-12 | Cathode 12a | ⊚ | Example 4-12 | Battery 12a | ⊚ | ⊚ |
| Example 2-13 | Cathode 13a | ⊚ | Example 4-13 | Battery 13a | ⊚ | ⊚ |
| Example 2-14 | Cathode 14a | ⊚ | Example 4-14 | Battery 14a | ⊚ | ⊚ |
| Example 2-15 | Cathode 15a | ⊚ | Example 4-15 | Battery 15a | ⊚ | ⊚ |
| Example 2-16 | Cathode 16a | ⊚ | Example 4-16 | Battery 16a | ⊚ | ⊚ |
| Example 2-17 | Cathode 17a | ⊚ | Example 4-17 | Battery 17a | ⊚ | ⊚ |
| Example 2-18 | Cathode 18a | ⊚ | Example 4-18 | Battery 18a | ⊚ | ⊚ |
| Comparative Example 2-1 | Comparative Cathode 1a | X | Comparative Example 4-1 | Comparative Battery 1a | X | X |
| Comparative Example 2-2 | Comparative Cathode 2a | X | Comparative Example 4-2 | Comparative Battery 2a | X | X |
| Comparative Example 2-3 | Comparative Cathode 3a | X | Comparative Example 4-3 | Comparative Battery 3a | X | X |
| Comparative Example 2-4 | Comparative Cathode 4a | X | Comparative Example 4-4 | Comparative Battery 4a | X | X |
| Comparative Example 2-5 | Comparative Cathode 5a | X | Comparative Example 4-5 | Comparative Battery 5a | X | X |
| Comparative Example 2-6 | Comparative Cathode 6a | X | Comparative Example 4-6 | Comparative Battery 6a | X | X |
| Example 3-1 | Cathode 1b | ⊚ | Example 5-1 | Battery 1b | ⊚ | ⊚ |
| Example 3-2 | Cathode 2b | ⊚ | Example 5-2 | Battery 2b | ⊚ | ⊚ |
| Comparative Example 3-1 | Comparative Cathode 1b | X | Comparative Example 5-1 | Comparative Battery 1b | X | X |
| Comparative Example 3-2 | Comparative Cathode 2b | X | Comparative Example 5-2 | Comparative Battery 2b | X | X |
| Comparative Example 3-3 | Comparative Cathode 3b | X | Comparative Example 5-3 | Comparative Battery 3b | X | X |
| Comparative Example 3-4 | Comparative Cathode 4b | X | Comparative Example 5-4 | Comparative Battery 4b | X | X |
| Comparative Example 3-5 | Comparative Cathode 5b | X | Comparative Example 5-5 | Comparative Battery 5b | X | X |

<4> Preparation of Non-Aqueous Electrolyte Secondary Battery

Examples 4-1 to 4-18, Comparative Examples 4-1 to 4-6, Examples 5-1 and 5-2, and Comparative Examples 5-1 to 5-5

The following standard anode and the cathode films shown in Table 5 were punched with dimensions of 50 mm×45 mm and 45 mm×40 mm, respectively. These electrode materials and the separator (porous polypropylene film) inserted therebetween were inserted into an aluminum laminate bag and dried at 70° C. for 1 hour in an electric oven.

Subsequently, 2 mL of the electrolytic solution was injected into the glove box filled with argon gas, the aluminum laminate bag was sealed, and the batteries 1a to 18a, the batteries 1b and 2b, the comparative batteries 1a to 6a, and the comparative batteries 1b to 5b were prepared. As the electrolytic solution, an incorporated solvent was prepared by incorporating ethylene carbonate, dimethyl carbonate, and diethyl carbonate at a ratio of 1:1:1 (volume ratio), and further, as an additive, a non-aqueous electrolytic solution in which 1 part of VC (vinylene carbonate) was added to 100 parts of the electrolytic solution and then $LiPF_6$ was dissolved at a concentration of 1 M was used.

Production Example 1: Preparation of Standard Anode Mixture Slurry

After adding acetylene black (manufactured by Denka Company Limited, Denka Black (registered trademark) HS-100), CMC, and water to a plastic container having a capacity of 150 mL, by using a rotating and revolving mixer (Awatori Rentaro ARE-310 manufactured by Thinky Corporation), the mixture was stirred at 2,000 rpm for 30 seconds.

Furthermore, the artificial graphite was added as an anode active material, and the mixture was stirred at 2,000 rpm for 150 seconds using a self-rotating and revolving mixer (Awatori Rentaro ARE-310 manufactured by Thinky Corporation). Then, the standard anode mixture slurry was obtained by adding SBR and stirring at 2,000 rpm for 30 seconds using a self-rotating and revolving mixer (Awatori Rentaro ARE-310 manufactured by Thinky Corporation). The solid content of the standard anode mixture slurry was 48% by mass. The solid content ratio of anode active material: conductive material:CMC:SBR in the standard anode mixture slurry was 97:0.5:1:1.5.

In addition, the abbreviations described above refer to the following.
HS-100: Denka Black HS-100 (manufactured by Denka Company Limited, acetylene black, average primary particle diameter 48 nm, specific surface area 39 $m^2/g$)
Artificial graphite: CGB-20 (manufactured by Nippon Graphite Industries, Co., Ltd.), solid content 100%

CMC: #1190 (manufactured by Daicel FineChem Ltd.), solid content 100%

SBR: TRD2001 (manufactured by JSR Corporation), solid content 48%

Production Example 2: Preparation of Standard Anode

The anode mixture slurry was coated onto a 20 μm thick copper foil, which serves as the current collector, using an applicator. Then, the coating was dried in an electric oven at 80° C.±5° C. for 25 minutes to adjust the amount of coating per unit area of the electrode to be 10 mg/cm². Furthermore, rolling treatment was performed by using a roll press (3t hydraulic roll press manufactured by THANK METAL Co., Ltd.) to prepare an anode having a density of anode mixture layer of 1.6 g/cm³.

Results and Considerations of Rate Test and Cycling Test

As shown in Table 5, batteries having a conductive material dispersion having good dispersibility in the cathode film had good rate characteristics and cycle characteristics. In contrast, all of the batteries having a conductive material dispersion having poor dispersion in the cathode film had poor characteristics. It is considered that a low-resistance cathode film has a low resistance as a battery and better rate characteristics.

In addition, comparatively, since the load of cycling is concentrated on the electrode active material particles having a low resistance, degradation is accelerated. On the other hand, it is considered that, in a case where a good conductive network is formed throughout, the load is dispersed, and thus, degradation is unlikely to occur.

Furthermore, in a case where the cathode film contains the conductive material dispersion of the comparative example in which the metallic foreign matter was not sufficiently removed during the production process, it is considered that the battery performance deteriorates due to the reduction and precipitation of residual metallic foreign matter (for example, iron, nickel, and chromium) derived from the conductive material dispersion on the anode, resulting in a short circuit of the battery.

As described above, according to the embodiment of the present invention, by achieving both the dispersibility and stability, it is possible to maintain a good dispersed state and form an efficient conductive network in the electrode film, and to produce a battery having good rate characteristics and cycle characteristics. In addition, by obtaining the conductive material dispersion with low viscosity, it is possible to improve the metallic foreign matter removal efficiency, and as a result, it is possible to produce a battery having good rate characteristics and cycle characteristics.

As described above, the present invention has been described with reference to representative embodiments, but the present invention is not limited by the description above. Various changes, which can be understood by those skilled in the art within the scope of the present invention, can be made to the configuration and details of the present invention.

The invention claimed is:

1. A conductive material dispersion containing a conductive material containing carbon fibers, a dispersant, and an amide-based organic solvent, wherein the dispersant contains a copolymer A containing a nitrile group-containing structural unit and satisfies following conditions:
    (I) a pH of the conductive material dispersion is 9.0 or greater;
    (II) a phase angle of the conductive material dispersion at a frequency of 1 Hz obtained by dynamic viscoelasticity measurement is 19° or greater, and a complex elastic modulus of the conductive material dispersion obtained by dynamic viscoelasticity measurement is less than 20 Pa.

2. The conductive material dispersion according to claim 1, wherein
    a carbon fiber concentration x (% by mass) in the conductive material dispersion and a complex elastic modulus y (Pa) of the conductive material dispersion obtained by dynamic viscoelasticity measurement satisfy relationships of the following expressions (1), (2), and (3):

$$y<8x \quad (1)$$

$$y<20 \quad (2)$$

$$0.1 \leq x \leq 10 \quad (3).$$

3. The conductive material dispersion according to claim 1, further containing 1% by mass or greater and 10% by mass or less of an inorganic base based on a mass of the copolymer A.

4. The conductive material dispersion according to claim 3, wherein
    the inorganic base is a hydroxide of an alkali metal or an alkaline earth metal.

5. The conductive material dispersion according to claim 1, wherein
    a content of water in the conductive material dispersion is less than 1% by mass.

6. A binder resin-containing conductive material dispersion, containing the conductive material dispersion according to claim 1 and a binder resin.

7. A slurry for an electrode film containing the conductive material dispersion according to claim 1 and an active material.

8. An electrode film containing a film formed using the conductive material dispersion according to claim 1.

9. A non-aqueous electrolyte secondary battery having a cathode, an anode, and an electrolyte, wherein
    the electrode film according to claim 8 is used for at least one of the cathode or the anode.

10. A slurry for an electrode film containing the binder resin-containing conductive material dispersion according to claim 6 and an active material.

11. An electrode film containing a film formed using the binder resin-containing conductive material dispersion according to claim 6.

12. The electrode film containing a film formed using the slurry for the electrode film according to claim 7.

13. A non-aqueous electrolyte secondary battery having a cathode, an anode, and an electrolyte, wherein
    the electrode film according to claim 11 is used for at least one of the cathode or the anode.

14. A non-aqueous electrolyte secondary battery having a cathode, an anode, and an electrolyte, wherein
    the electrode film according to claim 12 is used for at least one of the cathode or the anode.

* * * * *